(12) United States Patent
Fukuda et al.

(10) Patent No.: US 10,456,681 B2
(45) Date of Patent: Oct. 29, 2019

(54) GAME SYSTEM, DISPLAY CONTROLLING METHOD, DISPLAY CONTROLLING PROGRAM, AND RECORDING MEDIUM

(71) Applicant: SONY INTERACTIVE ENTERTAINMENT INC., Tokyo (JP)

(72) Inventors: Shizuto Fukuda, Tokyo (JP); Hisao Wada, Tokyo (JP); Shinji Aizawa, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/119,794

(22) PCT Filed: Dec. 9, 2014

(86) PCT No.: PCT/JP2014/082545
§ 371 (c)(1),
(2) Date: Aug. 18, 2016

(87) PCT Pub. No.: WO2015/133032
PCT Pub. Date: Sep. 11, 2015

(65) Prior Publication Data
US 2017/0050112 A1 Feb. 23, 2017

(30) Foreign Application Priority Data
Mar. 7, 2014 (JP) .................................. 2014-045590

(51) Int. Cl.
 A63F 13/52 (2014.01)
 A63F 13/25 (2014.01)
 A63F 13/30 (2014.01)

(52) U.S. Cl.
 CPC .............. *A63F 13/52* (2014.09); *A63F 13/25* (2014.09); *A63F 13/30* (2014.09)

(58) Field of Classification Search
 CPC ............ A63F 13/52; A63F 13/25; A63F 13/30
 See application file for complete search history.

(56) References Cited

U.S. PATENT DOCUMENTS

2007/0294089 A1* 12/2007 Garbow .................. A63F 13/12
 705/26.1
2009/0002316 A1* 1/2009 Rofougaran ............ A63F 13/12
 345/156

(Continued)

FOREIGN PATENT DOCUMENTS

| JP | 2010-46159 A | 3/2010 |
| JP | 2011-18146 A | 1/2011 |

(Continued)

OTHER PUBLICATIONS

International Preliminary Report on Patentability and Written Opinion of the International Searching Authority dated Sep. 22, 2016 from corresponding Application No. PCT/JP2014/082545.

(Continued)

*Primary Examiner* — Werner G Garner
(74) *Attorney, Agent, or Firm* — Katten Muchin Rosenman LLP

(57) ABSTRACT

A game system (information processing system (1)) includes: a communication section configured to be communicably connected to a network; an execution section configured to execute a game application; a display section configured to display an execution screen of a game based on the game application; an information acquisition section configured to acquire, from the network, information corresponding to the state of progress on the game; and a display control block configured to cause the display section to display a related picture including at least either text information or a play picture each related to the state of progress on the game, on the basis of the acquired information.

2 Claims, 17 Drawing Sheets

(56) References Cited

U.S. PATENT DOCUMENTS

| | | |
|---|---|---|
| 2009/0131171 A1 | 5/2009 | Miyazaki |
| 2011/0237332 A1 | 9/2011 | Abiko |
| 2012/0188694 A1 | 7/2012 | Sakakibara et al. |
| 2013/0005490 A1 | 1/2013 | Doya |
| 2013/0144956 A1 | 6/2013 | Sakai |
| 2014/0295959 A1* | 10/2014 | Osada ................. A63F 13/00 463/31 |

FOREIGN PATENT DOCUMENTS

| | | |
|---|---|---|
| JP | 2011-200437 A | 10/2011 |
| JP | 2011-253452 A | 12/2011 |
| JP | 2013-13509 A | 1/2013 |

OTHER PUBLICATIONS

International Search Report and Written Opinion dated Feb. 24, 2015, from the corresponding PCT/JP2014/082545.

* cited by examiner

GAME SYSTEM, DISPLAY CONTROLLING METHOD, DISPLAY CONTROLLING PROGRAM, AND RECORDING MEDIUM

TECHNICAL FIELD

The present invention relates to a game system, a display controlling method, a display controlling program, and a recording medium.

BACKGROUND ART

There have been known game devices each of which is connected to an operating device such as a controller that receives the input of operations performed thereon to let a game progress on the game device, pictures of the game being displayed on a display device connected to the game device (e.g., refer to PLT 1). The game device described in Patent Literature 1 is a so-called stationary game device that executes an application in a manner reflecting the input operations and allows the game to progress based on the application.

There have also been proposed game devices each communicating with an external apparatus in wired or wireless fashion to acquire content such as game applications, pictures (including motion pictures), and audios.

Meanwhile, there have been known mobile terminals each having a housing that includes an operating device and a display device. A processing device installed in the housing allows a game to progress in accordance with the operations input to the operating device (e.g., refer to PLT 2). This type of mobile terminal also has the function of communicating with an external apparatus in wired or wireless fashion.

CITATION LIST

Patent Literature

[PLT 1]
U.S. Patent Application Publication No. 2009/0131171
[PLT 2]
U.S. Patent Application Publication No. 2012/0188694

SUMMARY

Technical Problem

When searching for information such as the above-mentioned content, users generally input a search condition (i.e., search words) into an information processing device such as a PC (Personal Computer), a game device, or a mobile terminal. For example, while playing a game on the game device or mobile terminal, the user may want to peruse information corresponding to the current state of progress on the game. In that case, the user is required to interrupt the ongoing game to input the search condition. This can be a tiresome chore.

An object of the present invention is to provide a game system, a display controlling method, a display controlling program, and a recording medium for presenting information corresponding to the state of progress on a game.

Solution to Problem

According to a first embodiment of the present invention, there is provided a game system including: a communication section configured to be communicably connected to a network; an execution section configured to execute a game application; a display section configured to display an execution screen of a game based on the game application; an information acquisition section configured to acquire information corresponding to the state of progress on the game from the network; and a display control block configured to cause the display section to display a related picture including at least either text information or a play picture each related to the state of progress on the game, on the basis of the acquired information.

It is to be noted that the play picture includes a still picture and a motion picture.

According to the first embodiment, the information corresponding to the state of progress on the ongoing game is acquired from the network. The related picture based on the acquired information is displayed on the display section. In this manner, the related picture corresponding to the progress on the game being played by a user (player) is presented to the user in accordance with changes in the state of progress or at a predetermined timing. The user is thus presented with the picture serving as a reference for playing the game and finds it easier to proceed with the game. The use-friendliness of the game system is also improved.

Preferably in the first embodiment, the display section may display a picture in which the execution screen and the related picture are displayed in different positions. This variation of the first embodiment allows the execution screen and the related picture to be observed individually. Because the execution screen is not hidden by the related picture, the game is easier to play.

Preferably in the first embodiment, the display section may display a picture having the related picture superposed on the execution screen.

By having the related picture superposed on the execution screen, this variation of the first embodiment makes the following possible: If, for example, the execution screen is a selection screen prompting the user to select an appropriate option, the related picture can be displayed corresponding to the position of each option that may be selected from among the options included in the selection screen. This enables the user to better understand the content of the selected option, so that the game is easier to play.

In another example, the user may participate as a player in a game that can be played simultaneously by a plurality of players. In such a case, inside the execution screen reflecting the point of view of the player, the related picture reflecting the point of view of another player may be displayed corresponding to the position of a player character impersonating the other player. This allows the user to grasp the landscape being viewed by each player, making it easier to play the game and providing an enhanced sense of presence.

Preferably in the first embodiment, the display section may include a first display section and a second display section which are disposed in different positions, and one of the first and the second display sections may display the execution screen and the other display section may display the related picture.

The first and the second display sections may each be composed of a different display device.

This variation of the first embodiment has the display section made up of the first and the second display sections each disposed in a different position. The first and the second display sections are thus capable of displaying a different picture each. This enables the first display section to display either the execution screen or the related picture and allows the second display section to display the other screen or picture. The user can thus concentrate on the execution screen when playing the game. Also, the device on which the related picture is displayed can be used as a sub-screen.

Preferably in the first embodiment, the first display section may have a larger display area than the second display section; the first display section may display the execution screen; and the second display section may display the related picture.

This variation of the first embodiment allows the first display section having the relatively large display area to display the execution screen and permits the second display section having the relatively small display area to display the related picture. This enhances the visibility of the execution screen and makes it easier to play the game.

Preferably in the first embodiment, the game system may further include: a display device configured to have the first display section; a mobile terminal configured to have the second display section; and an information processing device configured to be connected to the display device and to the mobile terminal. The information processing device may include: the execution section and the information acquisition section; a device-side display control block configured to transmit the execution screen and cause the display device to display the execution screen; and a picture transmission portion configured to transmit the related picture and cause the second display section of the mobile terminal to display the related picture.

The information processing device may be connected to the display device and to the mobile terminal in either wired or wireless fashion.

Because the information processing device is subject to fewer constraints on the power supply, heat disposal, and internal space availability than the mobile terminal, the information processing device often provides a higher processing capacity than the mobile terminal.

Since the information processing device that has the execution section executing the game application includes the information acquisition section, it is possible to avert problems such as delays in the progress of the game during the process of acquiring information. The mobile terminal need only cause the second display section to display the related picture received from the information processing device, so that the processing load on the mobile terminal is reduced.

Preferably in the first embodiment, the game system may further include: a display device configured to have the first display section; a mobile terminal configured to have the second display section; and an information processing device configured to be connected to the display device and to the mobile terminal. The information processing device may include the execution section, and a device-side display control block configured to transmit the execution screen and cause the display device to display the execution screen. The mobile terminal may include: a progress information acquisition block configured to acquire the state of progress on the game executed by the execution section; the information acquisition section; and a terminal-side display control block configured to cause the second display section to display the related picture based on the acquired information.

As with the preceding variation of the first embodiment, the information processing device may be connected to the display device and to the mobile terminal in either wired or wireless fashion.

This variation of the first embodiment enables the information processing device to execute a game application requiring a relatively high processing capacity and causes the display device to display the execution screen. The mobile terminal is caused to execute the process of acquiring information corresponding to the state of progress on the game based on the game application executed by the information processing device, thereby displaying the related picture. In this manner, the processing involved is shared by the information processing device and by the mobile terminal. Even if the processing capacity of the information processing device and that of the mobile terminal are more or less the same, it is possible to unfailingly provide information corresponding to the state of progress on the game while the game is being played.

Preferably in the first embodiment, the game system may further include: a display device configured to have the first display section; a mobile terminal configured to have the second display section; and an information processing device configured to be connected to the display device and to the mobile terminal. The mobile terminal may include: the execution section and the information acquisition section; a terminal-side display control block configured to cause the second display section to display the execution screen of the game executed by the execution section; and a picture transmission portion configured to transmit the related picture to the information processing device. The information processing device may include a device-side display control block configured to cause the display device to display the received related picture.

As with the preceding variation of the first embodiment, the information processing device may be connected to the display device and to the mobile terminal in either wired or wireless fashion.

This variation of the first embodiment enables the mobile terminal to execute the game application and acquire the information corresponding to the state of progress on the game, and causes the information processing device to display the related picture received from the mobile terminal. In this manner, where the mobile terminal has a higher processing capacity than the information processing device or where the processing load on the information processing device is desired to be reduced for less power consumption, the processing load on the mobile terminal is increased. This allows the mobile terminal and the display device to unfailingly display the execution screen and the related picture, respectively.

According to a second embodiment of the present invention, there is provided a display controlling method performed by a display control device for displaying a picture on a display section. The display controlling method includes the steps of: acquiring, from a network, information corresponding to the state of progress on a game based on a game application; and causing the display section to display a related picture that includes at least either text information or a play picture each related to the state of progress on the game, on the basis of the acquired information.

The second embodiment of the present invention provides the same effects as the game system of the first embodiment when the display controlling method is performed by an information processing device or by a mobile terminal.

According to a third embodiment of the present invention, there is provided a display controlling program executed by a display control device for displaying a picture on a display section. The display controlling program includes the steps of: causing the display control device to acquire, from a network, information corresponding to the state of progress on a game based on a game application; and causing the display control device to let the display section display a related picture that includes at least either text information or a play picture each related to the state of progress on the game, on the basis of the acquired information.

The third embodiment of the present invention provides the same effects as the game system of the first embodiment when the display controlling program is executed using the information processing device or the mobile terminal as the display control device.

According to a fourth embodiment of the present invention, there is provided a recording medium on which the display controlling program is recorded in a manner readable by a computer.

The fourth embodiment of the present invention provides the same effects as the game system of the first embodiment when the display controlling program recorded on the recording medium is read and executed using the information processing device or the mobile terminal as the display control device. The recording medium may be a magnetic tape, a disk-type recording medium, an HDD (Hard Disk Drive), or a semiconductor memory, for example. Any one of such recording media may be used to install and execute the display controlling program. Also, the recording medium facilitates distribution of the display controlling program.

DESCRIPTION OF EMBODIMENTS

Embodiments of the present invention are described below with reference to the accompanying drawings.

Figure 1:
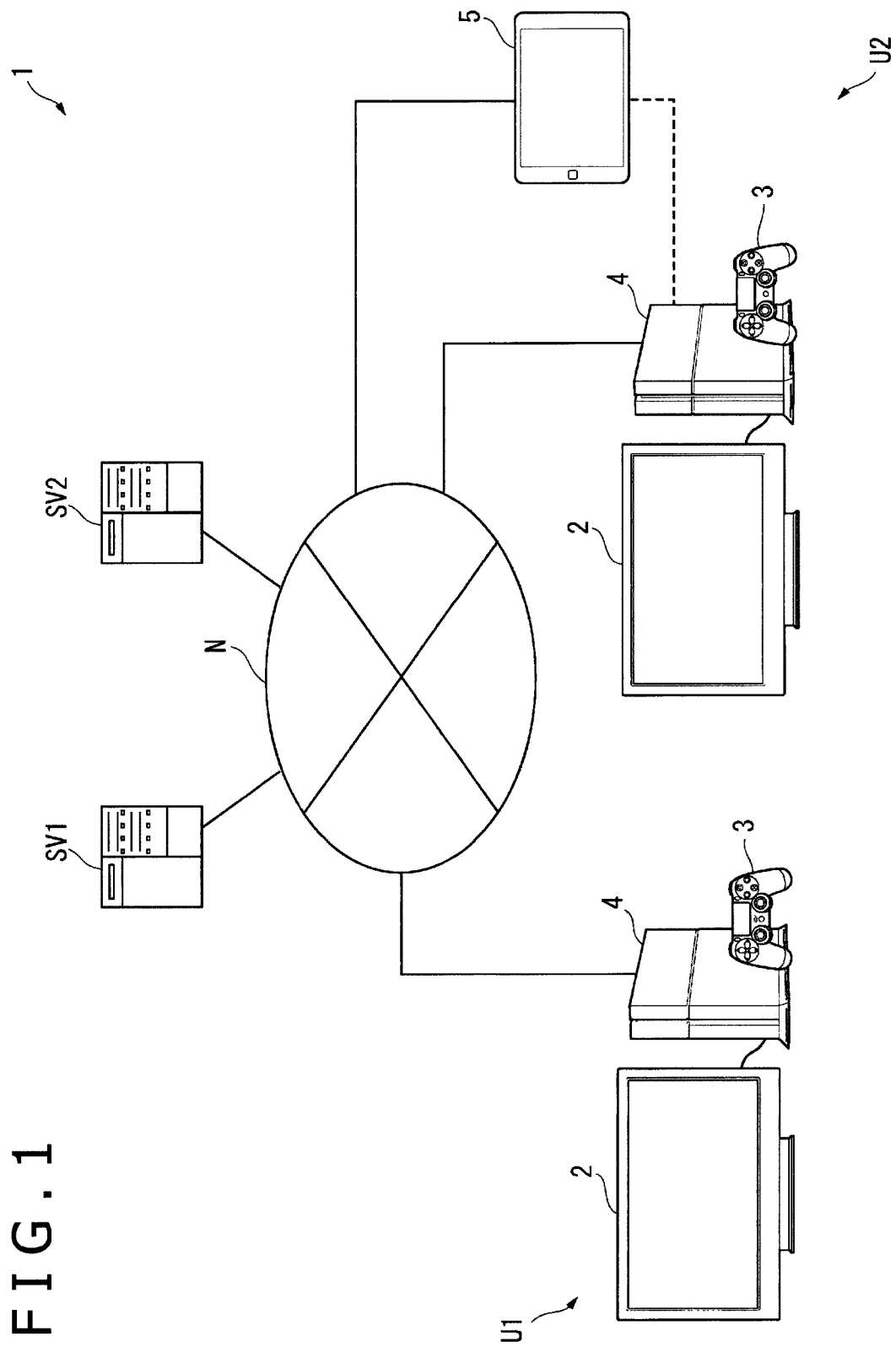
FIG. 1 is a schematic diagram depicting a configuration of an information processing system as one embodiment of the present invention.

FIG. 1 is a schematic diagram depicting a configuration of an information processing system 1 as one embodiment of the present invention.

The information processing system 1 embodying the present invention includes a game system according to the invention. As depicted in FIG. 1, the information processing system 1 includes a plurality of units U1 and U2 each having a display device 2, an operating device 3, and an information processing device 4. Also included in the system 1 are a data server SV1 and a management server SV2 both located on a network N. Of these system components, the unit U2 further includes a mobile terminal 5 that communicates with the information processing device 4. Each information processing device 4 and the mobile terminal 5 can communicate with the servers SV1 and SV2 via the network N.

In the information processing system 1 above, the information processing device 4 and the mobile terminal 5 individually execute a game application to allow a game based on the game application to progress. Also, the information processing device 4 and the mobile terminal 5 are each capable of transmitting to the servers SV1 and SV2 play information associating play-time acquired information including at least either a play motion picture of the game played by a player or text information input by the player, with player-related information indicative of the player, game identification information identifying the game, progress information including the state of progress on the game, and date and time information indicative of the date and time of the transmission.

The information processing device 4 and the mobile terminal 5 transmit the play information to the data server SV1. In turn, the data server SV1 holds the received play information in storage. By communicating with the data sever SV1 periodically, the management server SV2 manages content information indicative of the content of the play-time acquired information held in the data server SV1; server save information including the player-related information, game identification information, progress information, and date and time information; and terminal identification information indicative of the data server SV1 holding the play-time acquired information (i.e., save location information such as addresses on the data server SV1).

The information processing device 4 and the mobile terminal 5 may transmit to the data server SV1 at least the play-time acquired information out of the play information for storage in the data server SV1, and transmit the server save information and the terminal identification information to the management server SV2 for storage therein.

In the information processing system 1, meanwhile, the information processing device 4 and the mobile terminal 5 search the network N for play information that includes the play-time acquired information corresponding to the current state of progress on the game (i.e., play-time acquired information from other users in the similar state of progress). Specifically, the information processing device 4 and the mobile terminal 5 acquire from the management server SV2 the terminal identification information indicative of the data server SV1 that holds the play-time acquired information corresponding to the progress information based on the state of progress on the currently played game. The information processing device 4 and the mobile terminal 5 then acquire the relevant play information from the data server SV1 identified by the terminal identification information. Thereafter, the information processing device 4 and the mobile terminal 5 cause at least either the display device 2 or the mobile terminal 5 to display the acquired play information. In this manner, the play information corresponding to the state of progress on the game is searched for and displayed from time to time. While playing the game on the execution screen of the game (i.e., the game screen), the player can verify the play information corresponding to the state of progress on the game.

The structures making up the information processing system 1 are described below.

[Structure of the Data Server]

As mentioned above, the data server SV1 holds the play information received from the information processing device 4 and the mobile terminal 5. That is, the data server SV1 stores the play information and functions as a storage device or a file server that can be referenced from the outside.

[Structure of the Management Server]

The management server SV2 manages the play information and other resources held in the data server SV1. The management server SV2 receives the server save information and terminal identification information from the information processing device 4 and the mobile terminal 5 and manages the received information. As described above, the management server SV2 communicates periodically with the data server SV1 to collect and manage various pieces of information. Upon receipt of a search condition for searching for play information from the information processing device 4 or from the mobile terminal 5, the management server SV2 searches the server save information for the play information that matches the search condition, and transmits the terminal identification information related to the relevant play information to the information processing device 4 or to the mobile terminal 5 that has transmitted the search condition.

[Structures of the Display Device and Operating Device]

The display devices 2 constitute the display section of the present invention. Each display device 2, connected to an information processing device 4, displays pictures corresponding to picture information received from the connected information processing device 4 and outputs sound corresponding to audio information received therefrom.

A controller is adopted as the operating device 3 of this embodiment. The operating device 3 admits the input of operations performed by the user (player) and transmits operating information corresponding to the input operations to the information processing device 4. The operating device 3 is not limited to the controller; it may also be a pointing device such as a mouse.

[Structure of the Information Processing Device]

Figure 2:
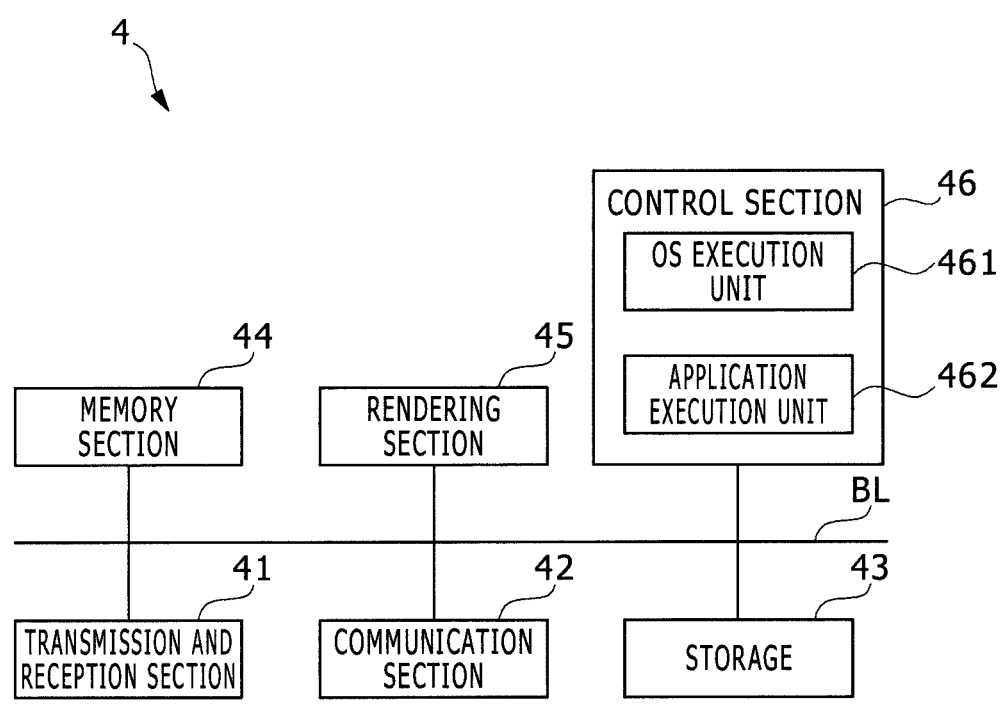
FIG. 2 is a block diagram depicting a structure of an information processing device in the embodiment.

FIG. 2 is a block diagram depicting a structure of the information processing device 4.

The information processing device 4 is constituted by a stationary game device or a PC (Personal Computer), for example. As such, the information processing device 4 corresponds to the information processing device and the display control device of the present invention. The information processing device 4 executes applications in accordance with the operating information received from the operating device 3. The information processing device 4 is further configured to communicate with the mobile terminal 5 and the servers SV1 and SV2.

As depicted in FIG. 2, the information processing device 4 includes a transmission and reception section 41, a communication section 42, a storage 43, a memory section 44, a rendering section 45, and a control section 46. These sections are interconnected by a bus line BL.

The transmission and reception section 41 is an interface connected to the display device 2 and to the operating device 3. For example, the transmission and reception section 41 transmits to the display device 2 pictures rendered by the rendering section 45, to be discussed later, and outputs to the control section 46 the operating information received from the operating device 3.

Under control of the control section 46, the communication section 42 acts as a communication module that communicates with external apparatuses such as the mobile terminal 5 and the servers SV1 and SV2. The communication section 42 may communicate with the mobile terminal 5 either in ad-hoc mode or in infrastructure mode. The communication section 42 also communicates with the servers SV1 and SV2 via the network N. Furthermore, under control of the control section 46, the communication section 42 can download programs (including applications) and data from other servers (not depicted) on the network N and store what is downloaded into the memory section 44 via the control section 46.

The storage 43 holds programs such as the OS (Operating System) controlling the operation of the information processing device 4 and game applications, as well as various data. Among these programs is a play information displaying program (including a display controlling program) for causing the control section 46 to perform a play information displaying process, to be discussed later. The storage 43 is typically provided as a reading device capable of reading at least data from a disk-type recording medium or a memory card, and as a memory device such as an HDD (Hard Disk Drive) or an SSD (Solid State Drive).

The memory section 44 is configured to have a RAM (Random Access Memory) and a VRAM (Video RAM), and provides a work area for the rendering section 45 and control section 46.

The rendering section 45 has a rendering circuit such as a GPU (Graphics Processing Unit). Under control of the control section 46, the rendering section 45 renders execution screens for the OS and applications (including game screens for game applications).

The control section 46 is configured to have a CPU (Central Processing Unit), for example. The control section 46 controls the information processing device 4 autonomously or in a manner reflecting the operating information. The control section 46 includes an OS execution unit 461 that executes the OS and an application execution unit 462 that executes the application designated by the OS execution unit 461. The application execution unit 462 corresponds to the execution section of the present invention which executes game applications.

Figure 3:
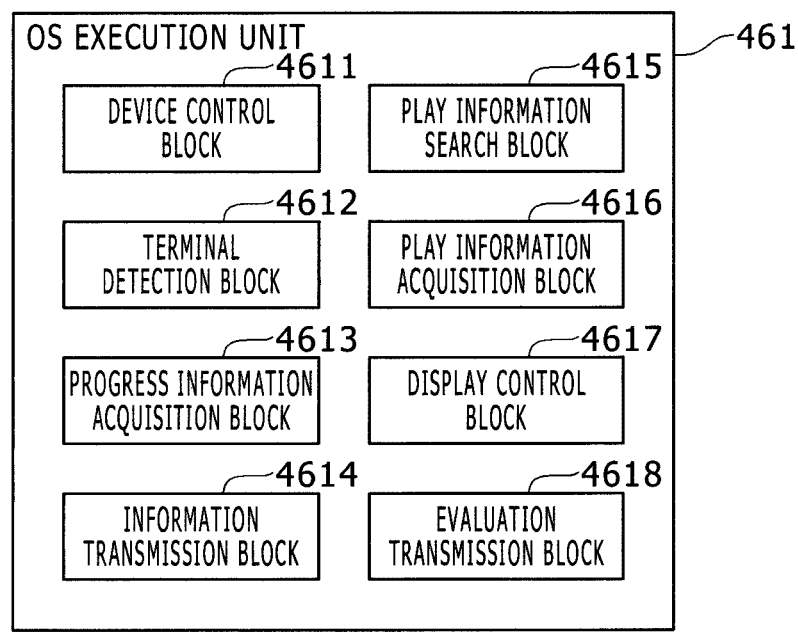
FIG. 3 is a block diagram depicting a structure of an operating system (OS) execution unit of the information processing device in the embodiment.

FIG. 3 is a block diagram depicting a structure of the OS execution unit 461.

As depicted in FIG. 3, the OS execution unit 461 includes a device control block 4611 that controls the operation of the information processing device 4 and a terminal detection block 4612 that detects the presence or absence of the mobile terminal 5 communicably connected via the communication section 42.

The device control block 4611 causes the application execution unit 462 to execute the application corresponding to the input operation performed by the player, for example.

In addition to the above components, the OS execution unit 461 includes a progress information acquisition block 4613, an information transmission block 4614, a play information search block 4615, a play information acquisition block 4616, a display control block 4617, and an evaluation transmission block 4618. These are functional blocks that function while the application execution unit 462 is executing a game application.

The progress information acquisition block 4613 acquires the game identification information identifying the game being executed by the application execution unit 462, as well as progress information indicative of the state of progress on the currently executed game. As the progress information, the progress information acquisition block 4613 acquires character position information indicating the position of a play character in the ongoing game (e.g., a map identification (ID) and coordinates), and a stage number indicating the current stage of the game.

The information transmission block 4614 captures the execution screen of the currently executed game (i.e., game screen) as a play motion picture and, if there is text information input by the player during the game, acquires that text information. The information transmission block 4614 then generates the play information including the play motion picture and the text information as play-time acquired information, and transmits that play information to the data sever SV1. The information transmission block 4614 also transmits the server save information to the management server SV2. Out of the play information, the information transmission block 4614 may transmit information including at least the play-time acquired information to the data server SV1 and transmit the server save information and terminal identification information to the management server SV2.

Player-related information included in the play information may include player identification information such as the account of the player held in the storage 43, as well as a range of disclosure set by the player as the range within which the transmitted play information may be disclosed. The disclosure range thus set may include a disclosure area and a disclosure period, in addition to player identification information identifying other players registered beforehand as "friends" by the user. The date and time information indicates the date and time at which the play information is uploaded to the servers SV1 and SV2.

With this embodiment, the play information is transmitted in real time while the application execution unit 462 is executing the game. Alternatively, the play information may be accumulated during execution of the game and transmitted at a predetermined timing. The timing may be set by the player. Alternatively, the timing may be when the player carries out a certain input operation on the operating device 3.

Because the player may or may not input the text information during execution of the game, the play-time acquired information may be transmitted with only the play motion picture included in some cases. Some players may permit transmission of the text information while not allowing play motion pictures to be transmitted. Thus the player can determine what information is to be included in the play-time acquired information. The information transmission block 4614 transmits the play information in accordance with the settings made by the player.

The information transmission block 4614 can also transmit a picture (related picture) based on the play information acquired by the play information acquisition block 4616, to be discussed later, to the mobile terminal 5 detected by the terminal detection block 4612. That is, the information transmission block 4614 corresponds to the picture transmission portion of the present invention. Furthermore, the information transmission block 4614 may transmit search information including the progress information to the mobile terminal 5, causing the mobile terminal 5 to search for and acquire play information corresponding to the state of progress on the game currently executed by the information processing device 4.

The play information search block 4615 searches the network N for the play information corresponding to the progress information acquired by the progress information acquisition block 4613.

Specifically, the play information search block 4615 first acquires the game identification information identifying the game currently executed by the application execution unit 462. The play information search block 4615 then searches the management server SV2 for the server save information that matches the game identification information. Given a list of the server save information obtained by the search, the play information search block 4615 searches for the server save information that includes progress information similar to the progress information indicative of the current state of progress on the game. If the list of the server save information obtained by the search includes server save information corresponding to the play information in which the disclosure range is set, the play information search block 4615 searches for the server save information that can be referenced within the disclosure range.

The steps of search performed by the play information search block 4615 may or may not proceed in the above-described sequence. The sequence of search may be changed as needed. Also, the play information search block 4615 may combine a plurality of search conditions so as to acquire a list of relevant server save information in one search pass.

From the list of server save information obtained through search by the play information search block 4615, the play information acquisition block 4616 selects at least one piece of server save information. The play information acquisition block 4616 proceeds to acquire the relevant play information from the data server SV1 identified by the terminal identification information related to the selected server save information.

In selecting a predetermined number of pieces of server save information, the play information acquisition block 4616 may find in the list the server save information about another player registered beforehand as a "friend" by the user. In such a case, the play information acquisition block 4616 may preferentially select the server save information about the other player. Also, the play information acquisition block 4616 may preferentially select the server save information of which the date and time of transmission indicated by the date and time information is close to the current date and time (including the server save information related to the play information transmitted in real time). The play information acquisition block 4616 may further select from the server save information the play information in descending order of its evaluation ranks, to be discussed later, thereby acquiring the play information. The priority sequence of the play information thus acquired may be set beforehand by the player, or may be changed as needed.

The display control block 4617 is a device-side display control block that causes the rendering section 45 to render the execution screen for the OS or the execution screen for the game application currently executed by the application execution unit 462 (i.e., game screen), and allows the execution screen to be displayed. The display control block 4617 further enables the play information acquired by the play information acquisition block 4616 to be displayed.

Specifically, suppose that the display device 2 is caused to display the execution screen and the picture corresponding to the play-time acquired information included in the acquired play information (i.e., picture related to the state of progress on the currently executed game; abbreviated as the related picture hereunder where appropriate). In this case, the display control block 4617 causes the rendering section 45 to render a display picture having these pictures arranged within a single screen. For example, the display control block 4617 causes the rendering section 45 to render a display picture in which the execution screen and the related picture are separately disposed (see display pictures DP1 and DP2 in FIGS. 7 and 8) or a display picture in which the related picture is superposed on the execution screen (see display pictures DP3 to DP5 in FIGS. 9 to 11). The display control block 4617 then causes the display device 2 to display the display picture thus rendered.

Suppose now that when the terminal detection block 4612 has detected the mobile terminal 5 communicably connected to the information processing device 4, the display control block 4617 is to make the display device 2 display the execution screen while causing the mobile terminal 5 to display the related picture. In such a case, the display control block 4617 causes the rendering section 45 to render a display picture in which the execution screen is set to full screen, and causes that displayed picture to be displayed. At this time, the information transmission block 4614 transmits the related picture to the mobile terminal 5.

Further, if the mobile terminal 5 is to acquire play information followed by the related picture, the display control block 4617 causes the rendering section 45 to render the related picture.

The player may select a mode in which to display the execution screen and the related picture. Alternatively, if the terminal detection block 4612 has detected the mobile terminal 5 communicating with the information processing device 4, the mode in which the mobile terminal 5 is caused to display the related picture may be automatically selected.

The evaluation transmission block 4618 transmits an evaluation by the player of the play information acquired by the play information acquisition block 4616 to the management server SV2 via the communication section 42. On the basis of the received evaluation, the management server SV2 updates an evaluation field for the server save information corresponding to the relevant play information.

[Structure of the Mobile Terminal]

Figure 4:
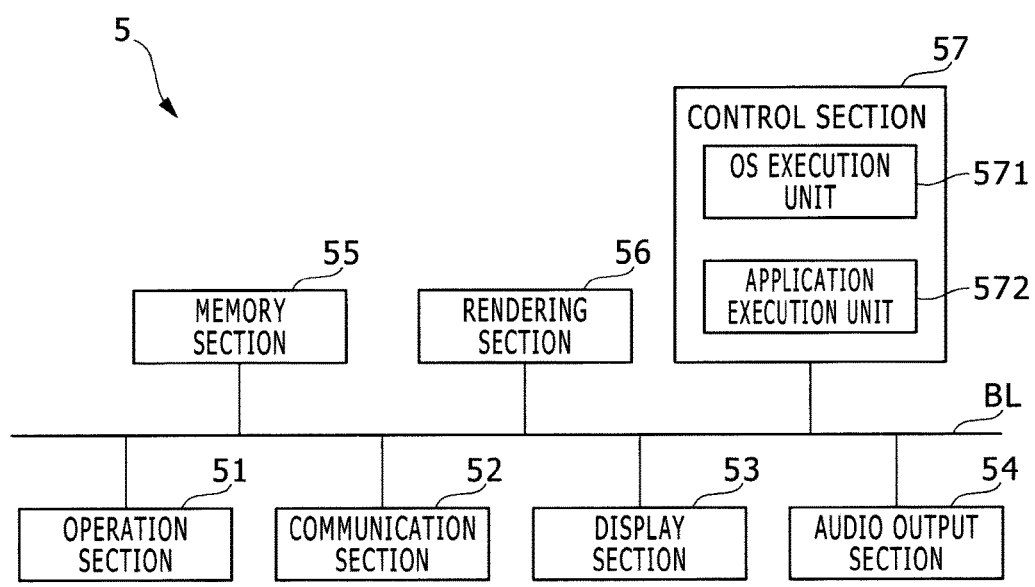
FIG. 4 is a block diagram depicting a structure of a mobile terminal in the embodiment.

FIG. 4 is a block diagram depicting a structure of the mobile terminal 5.

The mobile terminal 5 is formed by a laptop PC, a smartphone, a tablet, or a handheld video game machine, for example. As such, the mobile terminal 5 corresponds to the mobile terminal and the display control device of the present invention. As with the above-described information processing device 4, the mobile terminal 5 is configured to be capable of independently executing a game application and communicating with the servers SV1 and SV2 over the network N. That is, the mobile terminal 5 has approximately the same functionality as that of a configuration that combines the display device 2, operating device 3, and information processing device 4. Specifically, as depicted in FIG. 4, the mobile terminal 5 includes an operation section 51, a communication section 52, a display section 53, an audio output section 54, a memory section 55, a rendering section 56, and a control section 57, all interconnected via a bus line BL.

The operation section 51 outputs to the control section 57 an operation signal reflecting the input operation performed by the user (player). Typically, the operation section 51 is made up of physical keys (including those on a keyboard) or a touch panel provided on the enclosure of the mobile terminal 5, a pointing device, and/or a controller such as a mouse connected to the mobile terminal 5 in wired or wireless fashion.

Under control of the control section 57, the communication section 52 communicates with external apparatuses such as the information processing device 4 and the servers SV1 and SV2. The communication section 52 outputs the information received from the external apparatus to the control section 57, and transmits the information input from the control section 57 to the relevant external apparatus.

The display section 53 constitutes the display section of the present invention. The display section 53 has a display device such as an organic EL (Electro-Luminescence) device or a liquid crystal display device that displays the picture corresponding to an input picture signal.

The audio output section 54 has a speaker that outputs sound corresponding to an input audio signal.

The memory section 55 includes a volatile memory portion such as a RAM and a VRAM, and a nonvolatile memory portion such as a flash memory, an HDD or an SSD.

The volatile memory portion above provides a work area for the rendering section 56 and control section 57.

The nonvolatile memory portion stores programs such as the OS controlling the mobile terminal 5 and applications, as well as data necessary for operating the mobile terminal 5. Among the stored programs is a play information displaying program (including a display controlling program) for causing the control section 57 to perform a play information displaying process, to be discussed later. Among the stored data is connection information necessary for communicating with the servers SV1 and SV2.

The rendering section 56 has a rendering circuit such as a GPU. Under control of the control section 57, the rendering section 56 renders in the memory section 55 the picture to be displayed on the display section 53. For example, the rendering section 56 renders the execution screens for the OS and application executed by the control section 57, as well as the related pictures acquired from the information processing device 4 or from the data server SV1. The rendering section 56 causes the display section 53 to display the pictures thus rendered.

Figure 5:
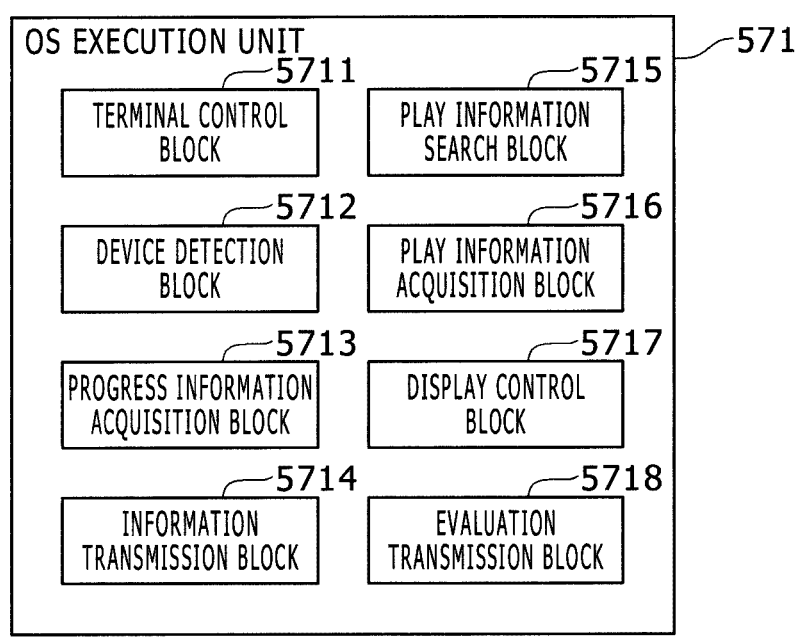
FIG. 5 is a block diagram depicting a structure of an OS execution unit of the mobile terminal in the embodiment.

FIG. 5 is a block diagram depicting a structure of an OS execution unit 571.

As with the control section 46, the control section 57 includes the CPU for example, and controls the operation of the mobile terminal 5. As with the control section 46, the control section 57 includes the OS execution unit 571 that executes the OS held in the memory section 55 and an application execution unit 572 that executes applications, the two units being functional units.

Of these units, the OS execution unit 571 includes a terminal control block 5711 that controls the operation of the mobile terminal 5 and a device detection block 5712 that detects the presence or absence of the information processing device 4 connected communicably via the communication section 52, as depicted in FIG. 5. The terminal control block 5711 causes the application execution unit 572 to execute the application corresponding to the input operation performed by the player.

In addition to the above-mentioned sections, units or blocks, the OS execution unit 571 includes a progress information acquisition block 5713, an information transmission block 5714, a play information search block 5715, a play information acquisition block 5716, a display control block 5717, and an evaluation setting block 5718. These blocks are functional blocks.

While the application execution unit 572 is executing the game application, the progress information acquisition block 5713 acquires the progress information indicative of the state of progress on the game. When the communication section 52 receives search information including the progress information from the information processing device 4, the progress information acquisition block 5713 acquires the search information.

The functions of the functional blocks 5714 to 5718 are the same as those of the functional blocks 4614 to 4618, respectively, in the information processing device 4 and thus will not be discussed further.

[Use Modes of the Information Processing System]

The use modes of the information processing system 1 are described below.

The information processing system 1 provides the user with the play information in any one of five use modes depending on the entity that executes the game application, the entity that searches for and acquires the play information, and the entity that displays the play information. Any one of these use modes may be selected and set by the user (player) for example in using the information processing system 1. In each use mode, at least either the information processing device 4 or the mobile terminal 5 performs a play information displaying process in accordance with the above-mentioned play information displaying program. Performing the play information displaying process in this manner presents the user with information based on play information. That is, the play information displaying program includes the display controlling program of the present invention, and the play information displaying process includes the display controlling method of the invention.

[First Use Mode]

The first use mode is a use mode in which either the information processing device 4 or the mobile terminal 5 executes the game application, acquires the play information, and causes the related picture to be displayed together with the execution screen of the game. In the first use mode, one display picture includes the execution screen and related pictures.

Figure 6:
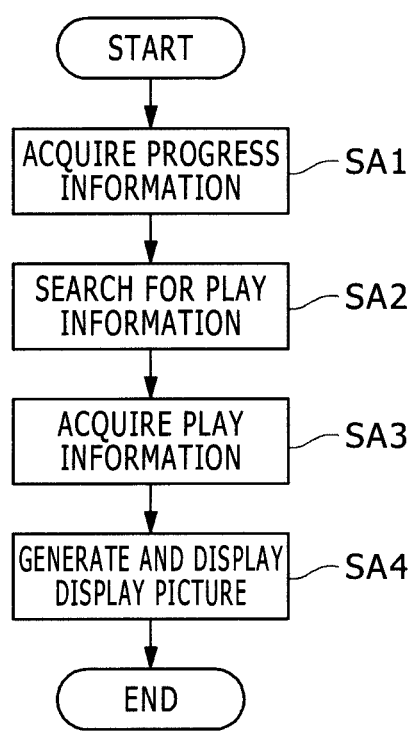
FIG. 6 is a flowchart depicting a play information displaying process performed in a first use mode of the embodiment.

FIG. 6 is a flowchart depicting the play information displaying process performed by the information processing device 4 or by the mobile terminal 5 in the first use mode.

When the information processing device 4 causes the display device 2 to display the related picture in the first use mode, the information processing device 4 executes the play information displaying process, to be discussed below.

In the play information displaying process, as depicted in FIG. 6, the progress information acquisition block 4613 first acquires the progress information indicative of the state of progress on the game currently executed by the application execution unit 462 (step SA1).

Then on the basis of the game identification information and on the acquired progress information, the play information search block 4615 searches the server save information held in the management server SV2 for the play information corresponding to the progress information similar to the acquired progress information (step SA2).

Thereafter, the play information acquisition block 4616 acquires the play information thus searched for from the data server SV1 that holds the play information of interest (step SA3).

The display control block 4617 causes the rendering section 45 to generate and render a display picture that includes the execution screen of the game and the related picture corresponding to the play-time acquired information included in the acquired play information, and causes the display device 2 to display the display picture thus rendered (step SA4).

Performing the above-described play information displaying process causes the display device 2 to display the display picture that combines the execution screen of the game and the related picture. There is a case where the mobile terminal 5, while executing the game application, acquires and displays the play information corresponding to the state of progress on the game. In that case, the above functional blocks 4613 and 4615 to 4617 are taken over by the functional blocks 5713 and 5715 to 5717, respectively, in the control section 57 acting to execute the play information displaying process.

[Structure of the Display Picture]

Figure 7:
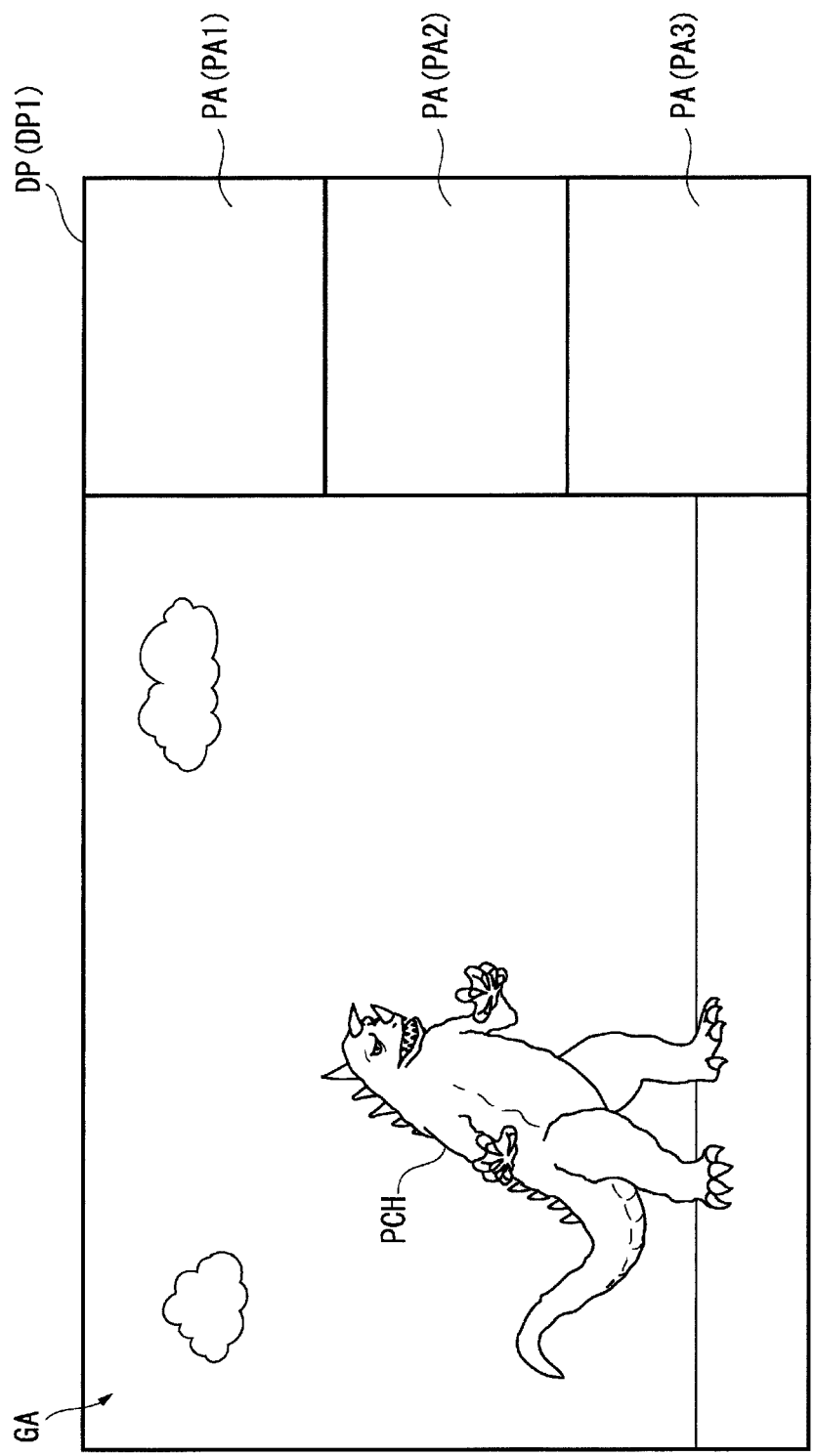
FIG. 7 is a schematic diagram depicting a typical display picture displayed in the first use mode of the embodiment.

FIG. 7 is a schematic diagram depicting a display picture DP1 as one example of the display picture DP displayed in the first use mode.

Display pictures DP1 to DP5 to be described below are typical display pictures that the display control block 4617 or 5717 causes the rendering section 45 or 56 to render during the play information displaying process. The display picture DP1 depicted in FIG. 7 is a picture in which is set a game execution screen scrolled to the right during the ongoing game with a player character PCH moving rightward in keeping with the player's operations. On the left side of the display picture DP1 is an execution screen setting area GA in which the game execution screen is set. Arranged vertically on the right side of the display picture DP1 are three related picture setting areas PA (PA1 to PA3) in which related pictures are set. Typical pictures to be set in the related picture setting areas PA1 to PA3 are not depicted.

Each of the related picture setting areas PA1 to PA3 is set with a related picture based on the play information acquired with regard to the current position of the player character PCH during the game.

For example, the top related picture setting area PA1 is set with a related picture based on the play information corresponding to a position that the player character PCH has moved past.

The middle related picture setting area PA2 is set with a related picture based on the play information corresponding to a position close to the current position of the player character PCH.

The bottom related picture setting area PA3 is set with a related picture based on the play information corresponding to a position ahead of the current position of the player character PCH.

The display picture DP1 thus displayed allows the player to verify whether any item has been left out, check for an enemy character that the player character PCH will encounter, or study how another player is battling the enemy.

During display of the display picture DP1, the related pictures to be set in the related picture setting areas PA may be switched as needed. For example, if the player wants to verify the related picture based on the play information ahead of the current position of the player character PCH, the player may perform a suitable input operation. Upon receipt of operation information or an operation signal reflecting the input operation, the play information search block 4615 or 5715 again searches for the relevant play information.

If the player wants to change the display positions of the related pictures, the player may perform another suitable input operation. On receiving the operation information or operation signal reflecting the input operation, the display control block 4617 or 5717 changes the arrangement order of the related picture setting areas PA.

Further, in keeping with the state of progress on the game, the display control block 4617 or 5717 may stop or skip reproduction of a motion picture as a related picture set in a given related picture setting area PA, or may display another related picture based on other play information.

In addition, on the basis of the position of the play character PCH included in the game execution screen, the display control block 4617 or 5717 may display time differences relative to other player characters PCH included in the related pictures.

Figure 8:
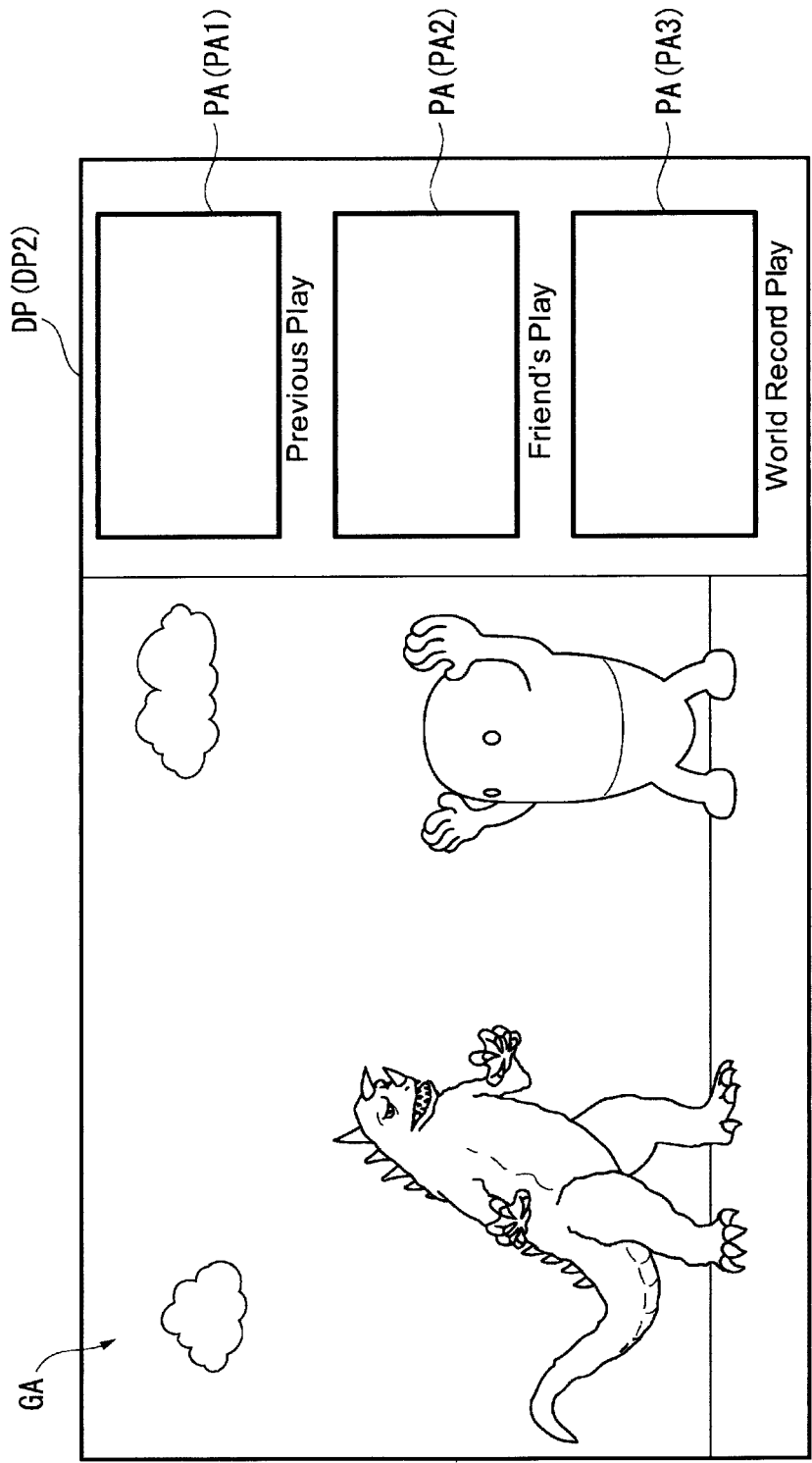
FIG. 8 is a schematic diagram depicting another typical display picture displayed in the first use mode of the embodiment.

FIG. 8 is a schematic diagram depicting a display picture DP2 as another example of the display picture DP displayed in the first use mode.

A related picture based on the play information about the player's past history may be set in a related picture setting area PA such as the top related picture setting area PA1 in the display picture DP2 depicted in FIG. 8.

The display picture DP2 is set with a related picture based on the play information about the previous play of the player.

Further, a related picture based on the play information about the play of another player registered beforehand as a "friend" by the player may be set in another related picture setting area PA such as the middle related picture setting area PA2 in the display picture DP2. Set in this case may be the related picture based on the play information which comes from another player registered as a "friend," which includes the same game identification information as that of the currently played game, and which has the highest point count acquired from the game. The related picture thus set may alternatively be based on the play information that includes the date and time information indicative of the transmission date and time closest to the current date and time.

In addition, a related picture may be set in another related picture setting area PA such as the bottom related picture setting area PA3 in the display picture DP2, on the basis of the play information which includes the same game identification information as that of the currently played game and which has the highest point count acquired from the game or has the highest evaluation given in the game.

The display picture DP2 thus displayed allows the player to play the game while referencing the play of another player.

Figure 9:
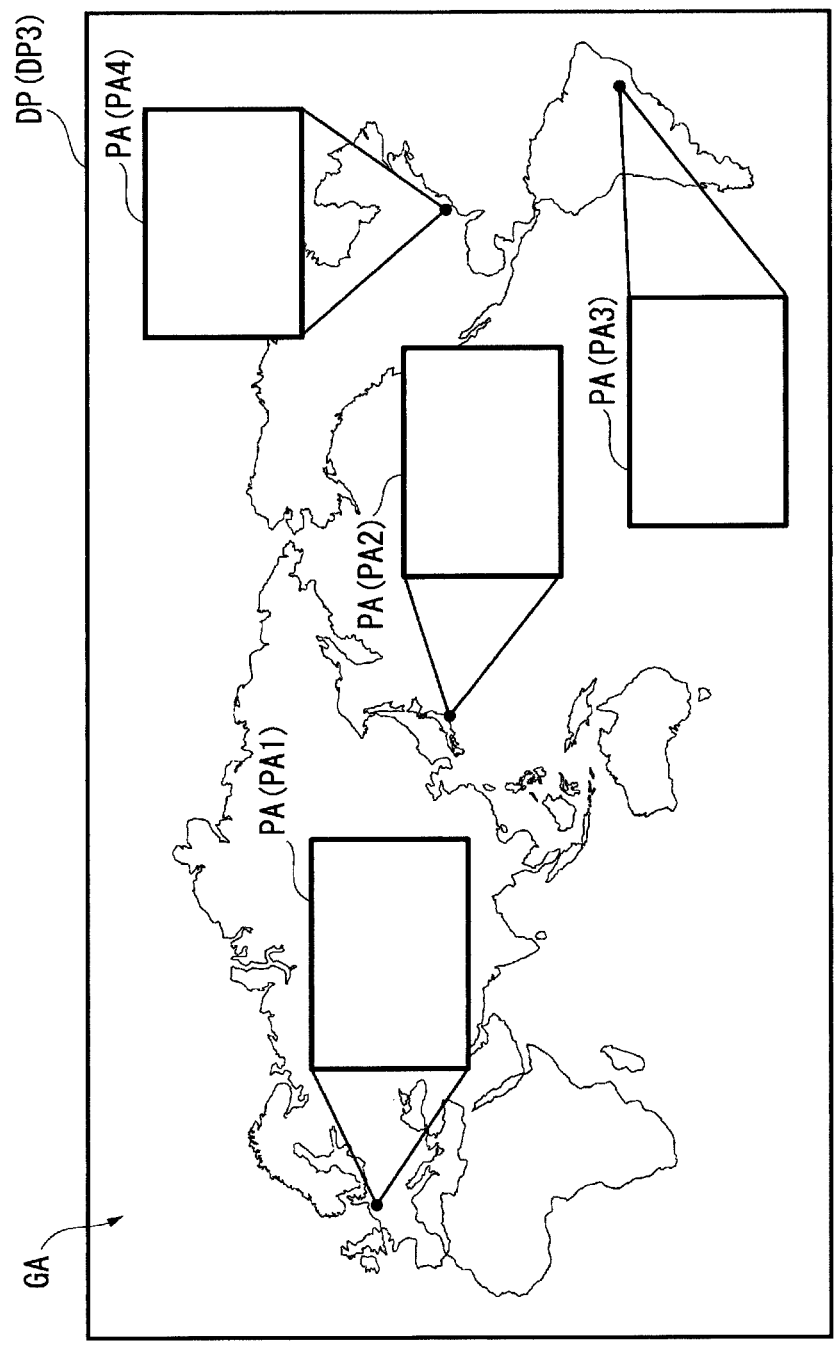
FIG. 9 is a schematic diagram depicting another typical display picture displayed in the first use mode of the embodiment.

FIG. 9 is a schematic diagram depicting a display picture DP3 as another example of the display picture DP displayed in the first use mode.

Set in the display picture DP, the execution screen setting area GA and the related picture setting areas PA need not be arranged separately. The related picture setting areas PA may be superposed on the execution screen setting area GA.

The display picture DP3 depicted in FIG. 9 is a picture in which is set a stage selection screen (execution screen). The stage selection screen allows the player to select stages of the game. The display picture DP3 is set with a full-screen execution screen setting area GA in which the stage selection screen is provided. A plurality of related picture setting areas PA are superposed on the execution screen setting area GA.

The related picture setting areas PA are arranged corresponding to the options for selecting the stage in the stage selection screen. In the example of FIG. 9, the stage selection screen is set to include four cities located on a world map as the options on the execution screen setting area GA. A related picture setting area PA is set corresponding to the location of each of the cities. In each related picture setting area PA, a related picture is set on the basis of the play information having the city selected as the stage.

The display picture DP3 thus displayed allows the player to verify the content of the play at each stage before selecting that stage.

Figure 10:
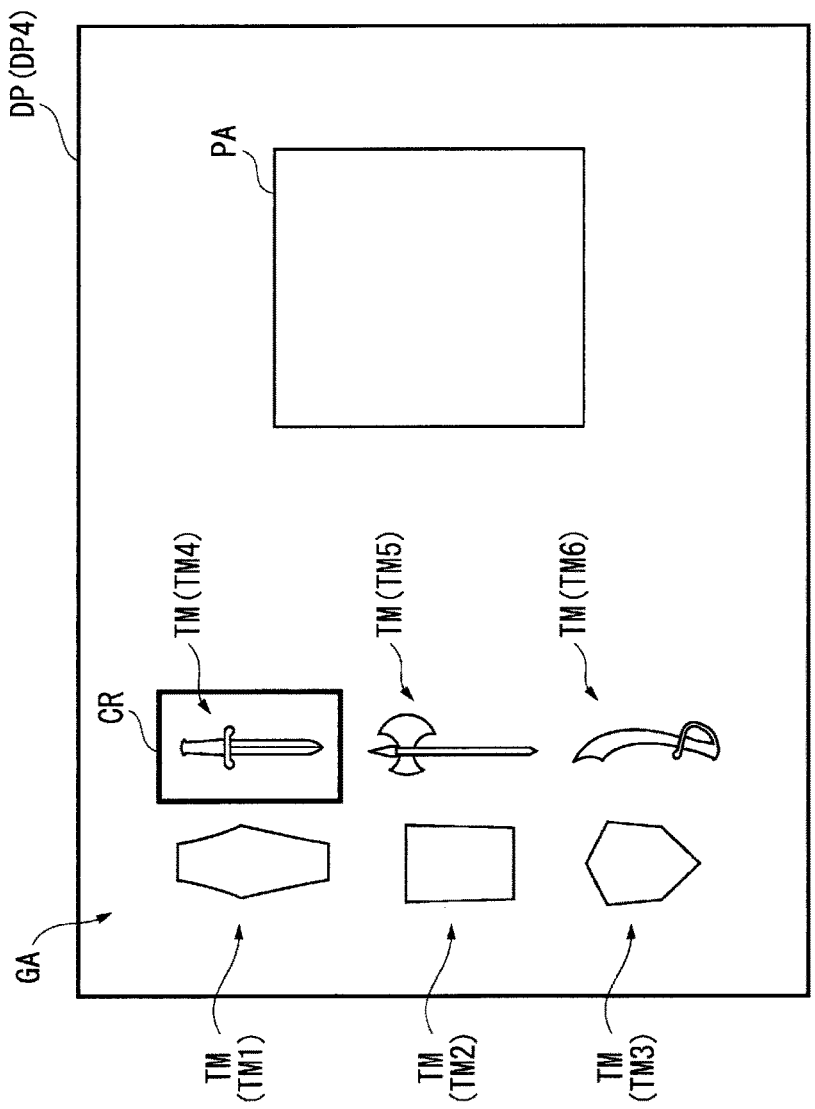
FIG. 10 is a schematic diagram depicting another typical display picture displayed in the first use mode of the embodiment.

FIG. 10 is a schematic diagram depicting a display picture DP4 as another example of the display picture DP displayed in the first use mode.

The display picture DP4 depicted in FIG. 10 is a picture set with an item selection screen (execution screen) for allowing the player to select one of the items acquired during the game, the selected item being used to arm the player character. Set to full-screen in the display picture DP4 is the execution screen setting area GA in which the item selection screen is provided. A related picture setting area PA is superposed on the execution screen setting area GA.

The related picture setting area PA above is set with a related picture, not depicted, based on the play information in effect when one of the items TM (TM1 to TM6) displayed on the item selection screen set in the execution screen setting area GA is selected to arm the play character for playing the game. For example, on the display picture DP4 depicted in FIG. 10, an item TM4 is selected by a cursor CR. This causes the related picture setting area PA to be with a related picture based on the play information having the progress information indicating that the item TM4 is selected.

The display picture DP4 thus displayed allows the player to verify the function and effect of the selected item before arming the play character with that item to play. If any relevant play information cannot be retrieved following the selection of any item or if the number of pieces of relevant play information is limited, the player is able to know that the selected item is a rare item.

Figure 11:
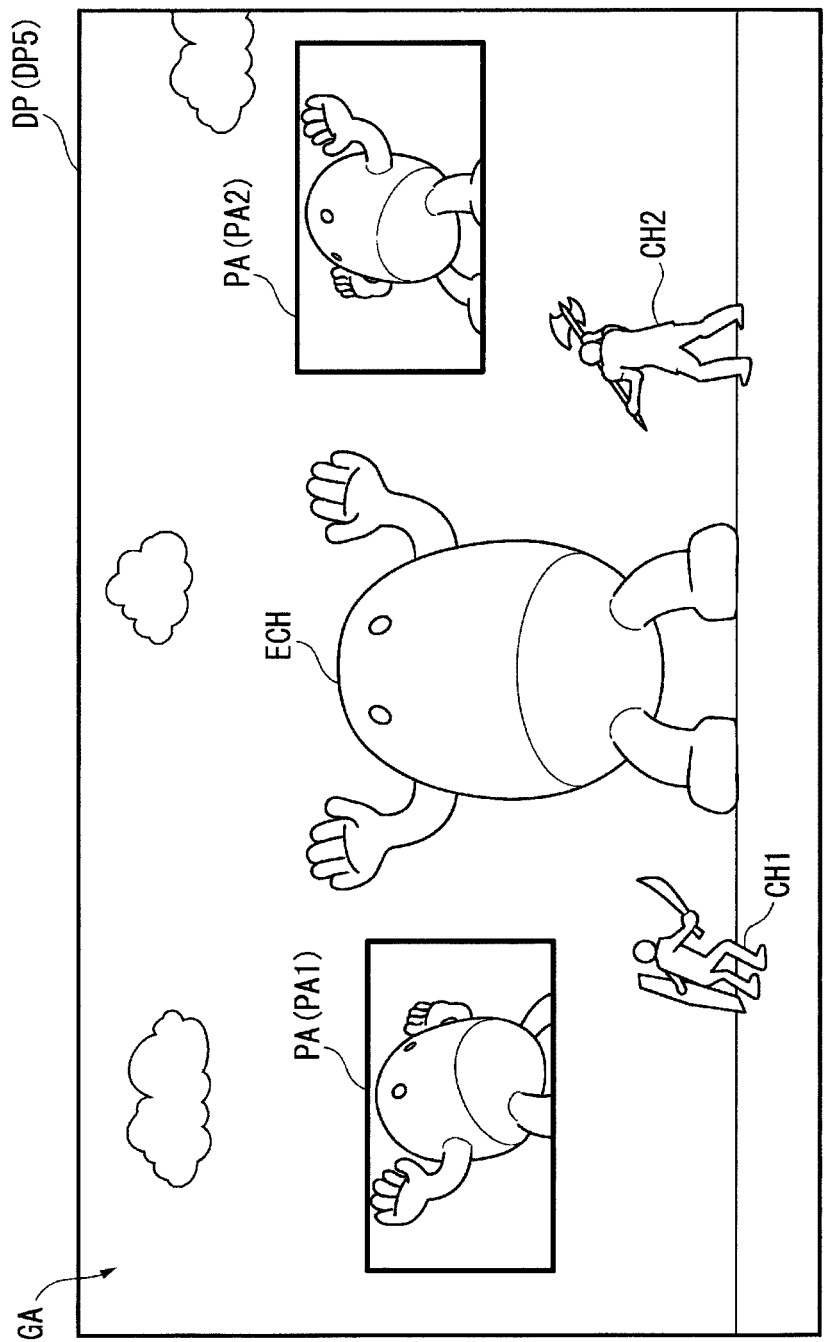
FIG. 11 is a schematic diagram depicting another typical display picture displayed in the first use mode of the embodiment.

FIG. 11 is a schematic diagram depicting a display picture DP5 as another example of the display picture DP displayed in the first use mode.

The display picture DP5 depicted in FIG. 11 is a picture on which is set an execution screen of a massively multi-player online role-playing game (MMORPG). On the display picture DP5, the execution screen setting area GA is set to full-screen. A plurality of related picture setting areas PA (PA1 and PA2) are set to be superposed on the area GA.

The left-side related picture setting area PA1 on the display picture DP5 is set with a picture based on the play information about another player who operates a character CH1. In other words, the related picture setting area PA1 is set with a picture of a virtual space rendered from the viewpoint of the other player. Likewise, the right-side related picture setting area PA2 is set with a picture based on the play information about yet another player who operates a character CH2. In other words, the related picture setting area PA2 is set with a picture of a virtual space rendered from the viewpoint of yet another player. Thus the pictures set in the areas PA1 and PA2 on the display picture DP5 depicted in FIG. 11 illustrates differently how a character ECH is being viewed. This type of player information is acquired as the player information having the progress information similar to the position information indicative of the current position of the player character in the virtual space specific to the player.

The display picture DP5 thus displayed allows the player to play the game more easily thanks to a widened field of view derived from the above-mentioned virtual spaces.

[Second Use Mode]

The second use mode is a use mode in which the information processing device 4 executes the game application, searches for and acquires the play information, and causes the mobile terminal 5 to display related pictures based on the play information. In the second use mode, the execution screen of the game is displayed on the display device 2, and the related picture is displayed on the display section 53 of the mobile terminal 5.

Figure 12:
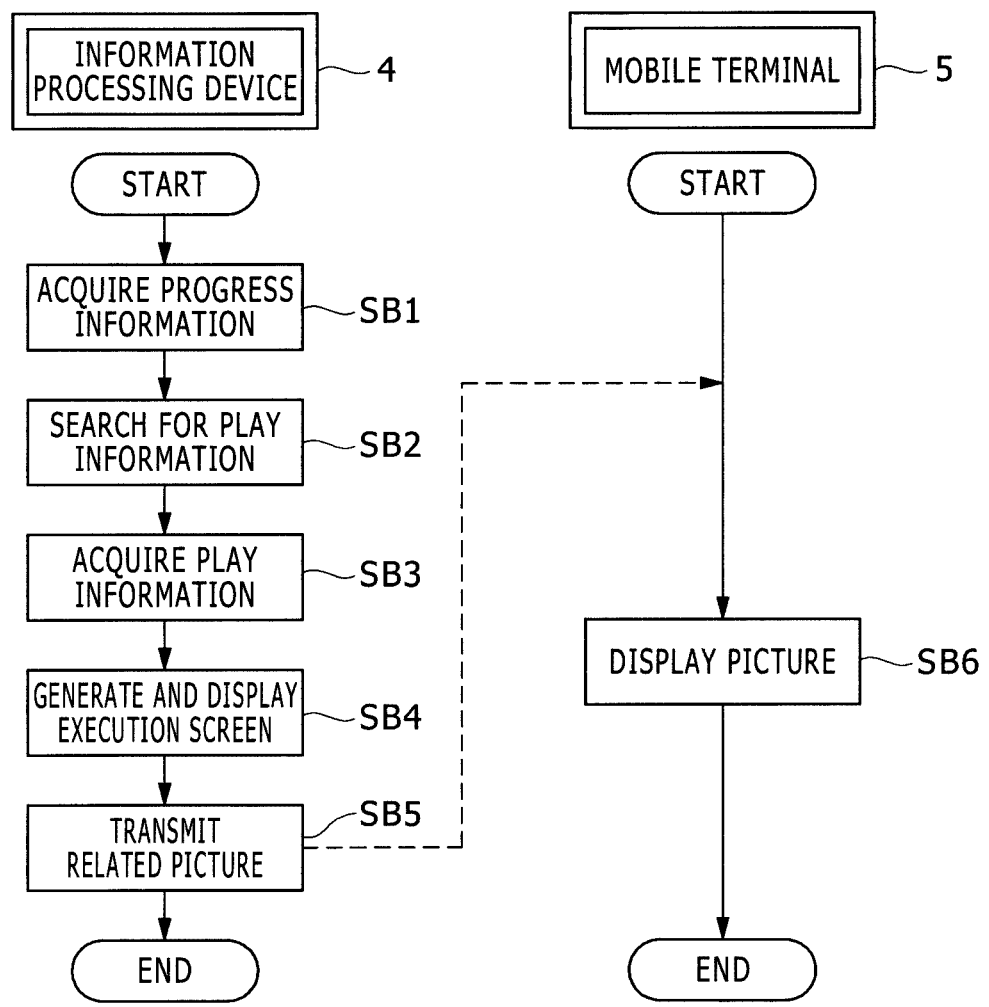
FIG. 12 is a flowchart depicting the play information displaying process performed in a second use mode of the embodiment.

FIG. 12 is a flowchart depicting the play information displaying process performed by the information processing device 4 and by the mobile terminal 5 in the second use mode.

In the second use mode, the information processing device 4 and mobile terminal 5 perform the play information displaying process as described below.

In the play information displaying process, as depicted in FIG. 12, the progress information acquisition block 4613, play information search block 4615, and play information acquisition block 4616 of the information processing device 4 first carry out steps similar to the above-described steps SA1 to SA3 (steps SB1 to SB3). This causes the play information corresponding to the state of progress on the ongoing game to be acquired from the data server SV1.

The display control block 4617 then causes the rendering section 45 to generate and render the execution screen of the game, and causes the display device 2 to display the rendered execution screen (step SB4).

The information transmission block 4614 transmits display information to the mobile terminal 5 via the communication section 42, the display information causing the mobile terminal 5 to display the related picture based on the acquired play information (step SB5).

In this manner, the information processing device 4 continuously transmits to the mobile terminal 5 the related picture based on the acquired play information while continuously displaying the execution screen of the currently executed game.

Meanwhile, the display control block 5717 of the mobile terminal 5 causes the rendering section 56 to render the related picture received and acquired by the communication section 52 from the information processing device 4. The display control block 5717 then causes the display section 53 to display the rendered related picture (step SB6).

Performing the play information displaying process above causes the display device 2 to display the execution screen of the currently played game, and allows the display section 53 of the mobile terminal 5 to display the related picture based on the play information searched for and acquired in keeping with the state of progress on the game.

[Structure of the Display Picture]

Figure 13:
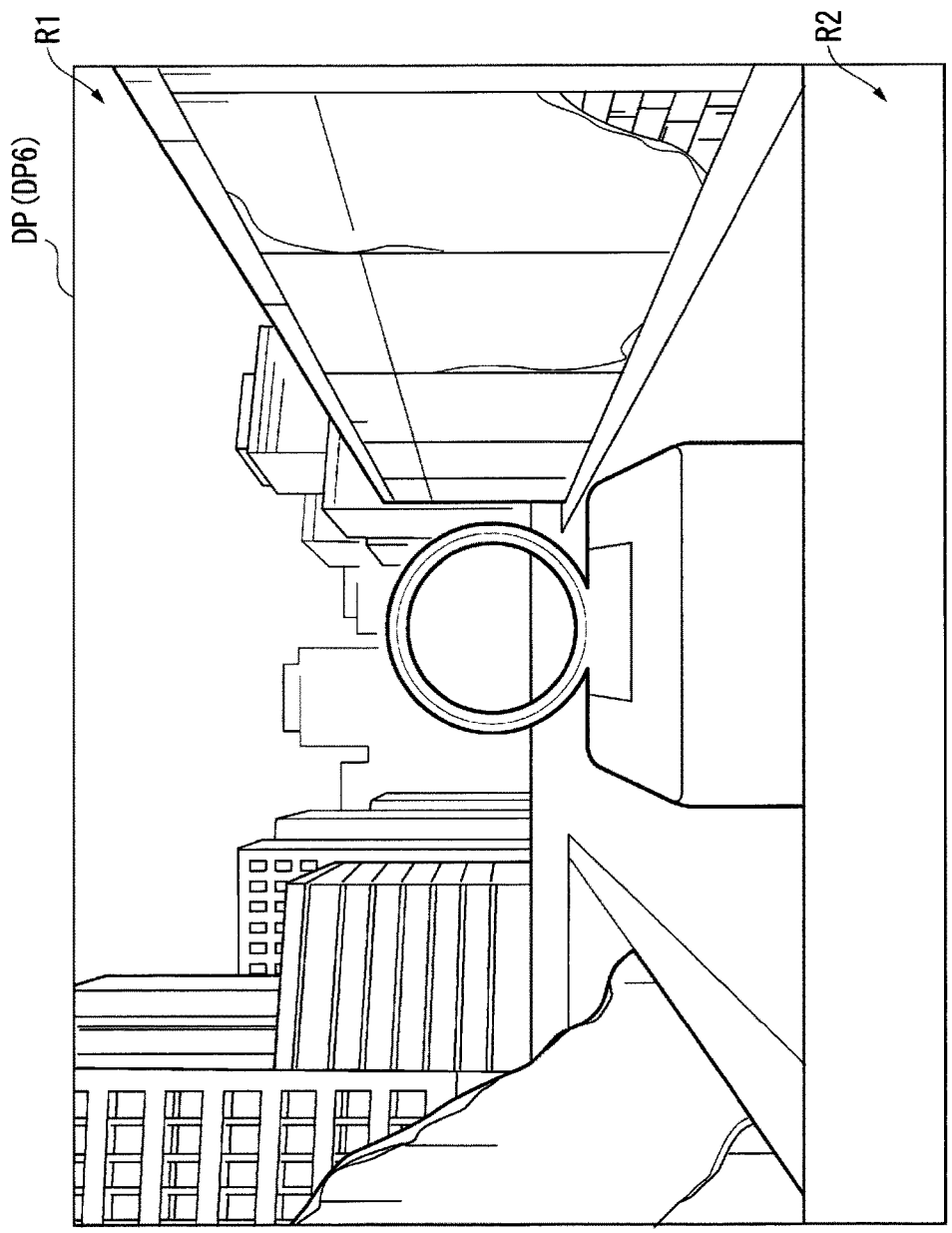
FIG. 13 is a schematic diagram depicting a typical display picture displayed in the second use mode of the embodiment.
Figure 14:
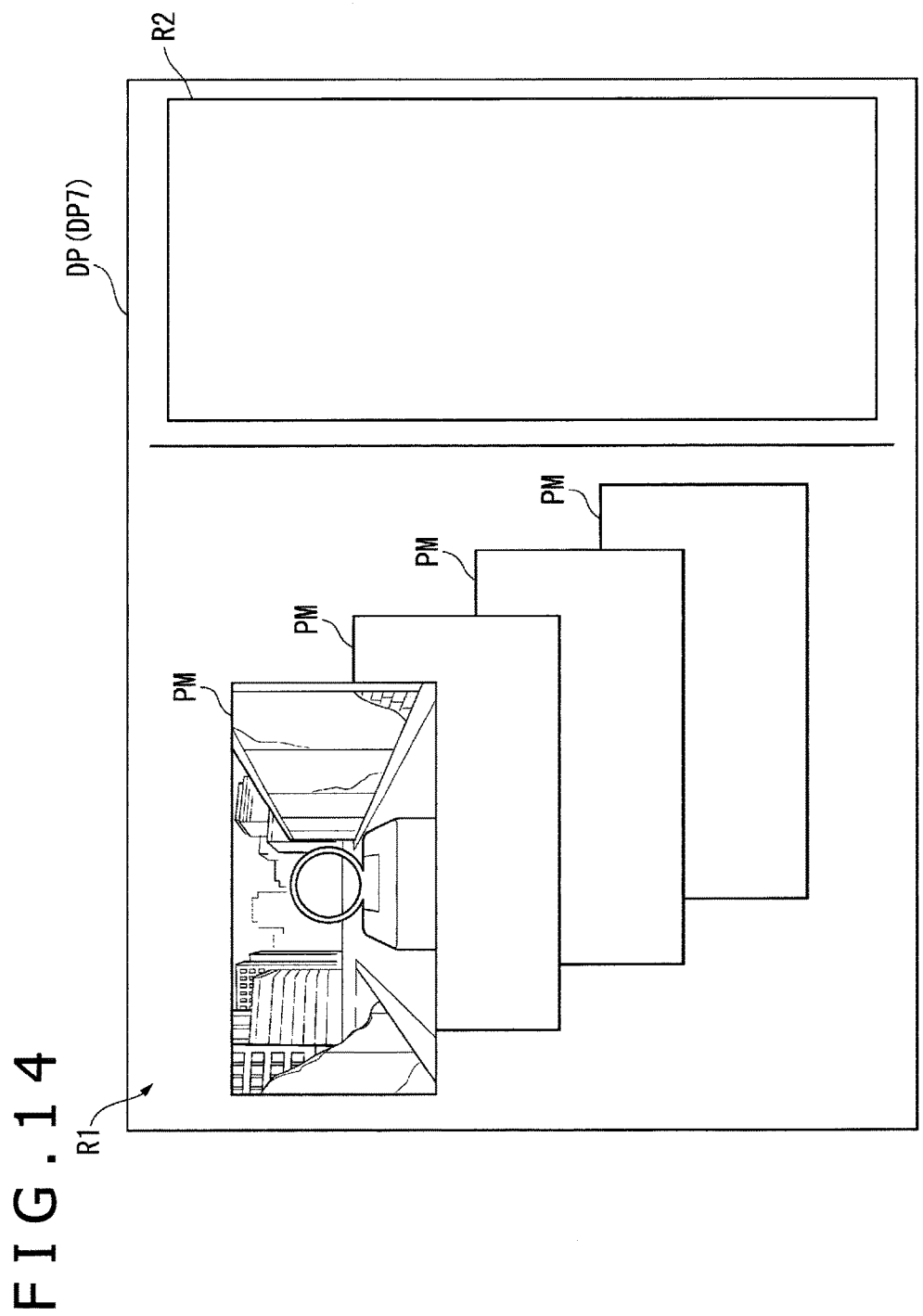
FIG. 14 is a schematic diagram depicting another typical display picture displayed in the second use mode of the embodiment.

FIGS. 13 and 14 are schematic diagrams depicting display pictures DP6 and DP7 as examples of the display picture DP displayed on the display section 53 in the second use mode.

The display pictures DP6 and DP7 to be described below are typical display pictures that the display control block 5717 causes the rendering section 56 to render during the play information displaying process above. The display pictures DP6 and DP7 in FIGS. 13 and 14 are each a display picture on which is set a related picture based on the play information acquired during play of an FPS (First Person Shooter), a shooting game executed by the information processing device 4.

A play motion picture setting region R1 is set in the upper area of the display picture DP6 in FIG. 13 as well as in the left-side area of the display picture DP7 in FIG. 14. The region R1 is set with a play motion picture derived from the play-time acquired information included in the acquired play information.

A text information setting region R2 is set in the lower area of the display picture DP6 as well as in the right-side area of the display picture DP7. The region R2 displays text information derived from the play-time acquired information included in the acquired play information. Typical text information set in the text information setting region R2 is not depicted.

The content of the play motion picture in the play motion picture setting region R1 and the content of the text information in the text information setting region R2 on the display picture DP6 are changed successively on the basis of the play information being newly acquired in the course of the game.

If a plurality of pieces of the play information are acquired, the play motion pictures PM corresponding to these pieces of information are set in the play motion picture setting region R1 on the display picture DP7. In this case, the play motion pictures PM are arranged imbricated in the depth direction, as depicted in FIG. 14. During display of the display picture DP7, these play motion pictures PM may all be reproduced simultaneously, or only the forefront play motion picture PM may be reproduced. If the mobile terminal 5 is operated to select a play motion picture PM not positioned at the forefront, the selected play motion picture PM is moved to the forefront and reproduced in that position.

The text information setting region R2 on the display picture DP7 is set with the text information corresponding to the play motion picture PM positioned at the forefront (i.e., text information included in the play-time acquired information that includes this play motion picture PM).

On the display picture DP7, the content of the play motion picture set in the region R1 and the content of the text information set in the region R2 are also changed successively on the basis of the play information being newly acquired in the course of the game.

[Third Use Mode]

The third use mode is a use mode in which the information processing device 4 executes the game application to display the execution screen of the game and in which the mobile terminal 5 acquires from the information processing device 4 search information including progress information indicative of the state of progress on the game, and searches for and acquires play information on the basis of the search information while displaying the related picture. That is, in the third use mode, the entity that executes the game is the information processing device 4 and the entity that searches for and processes the play information is the mobile terminal 5.

Figure 15:
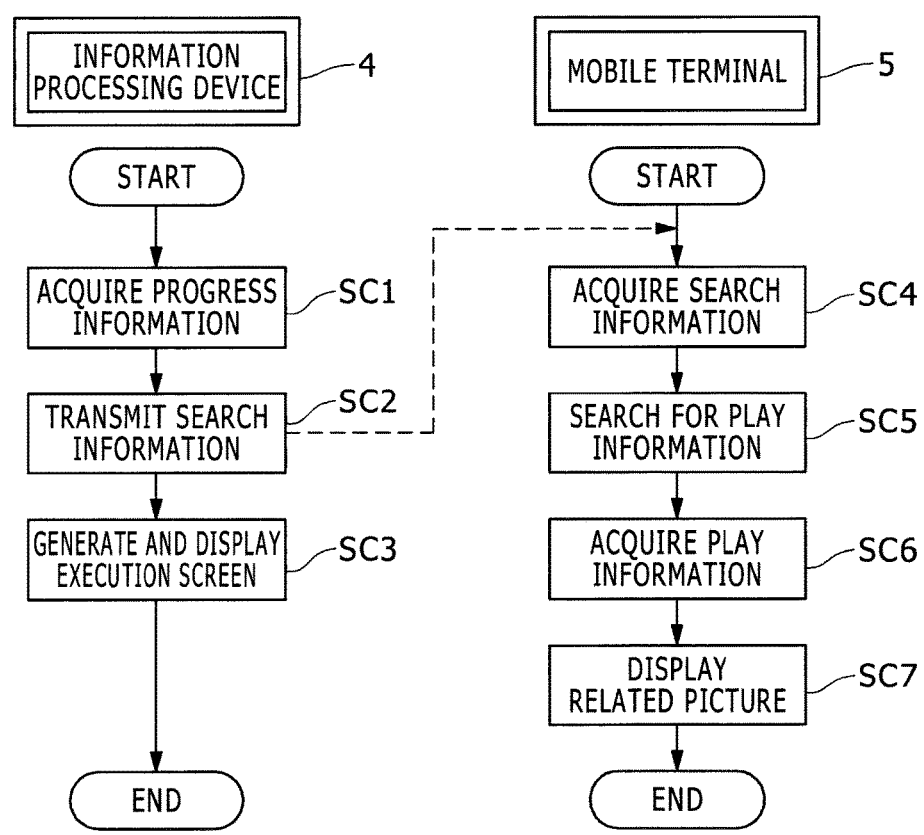
FIG. 15 is a flowchart depicting the play information displaying process performed in a third use mode of the embodiment.

FIG. 15 is a flowchart depicting the play information displaying process performed by the information processing device 4 or by the mobile terminal 5 in the third use mode.

In the third use mode, the information processing device 4 and the mobile terminal 5 carry out the play information displaying process as described below.

In the play information displaying process, as depicted in FIG. 15, the progress information acquisition block 4613 first acquires the progress information indicative of the state of progress on the game currently executed by the application execution unit 462 (step SC1) as in step SA1.

The information transmission block 4614 then transmits to the mobile terminal 5 search information including the acquired progress information, the player-related information, and the game identification information (step SC2).

The display control block 4617 causes the rendering section 45 to generate and render the execution screen of the game, and causes the display device 2 to display the rendered execution screen (step SC3) as in step SB4.

In this manner, the information processing device 4 continuously transmits to the mobile terminal 5 the search information including the progress information corresponding to the state of progress on the game while continuously displaying the execution screen of the currently executed game.

Meanwhile, the progress information acquisition block 5713 of the mobile terminal 5 acquires the search information including the progress information from the information processing device 4 (step SC4).

Next, the play information search block 5715 and the play information acquisition block 5716 perform steps similar to the above-described steps SA2 and SA3 (steps SC5 and SC6). This permits acquisition from the data server SV1 of the play information corresponding to the state of progress on the currently executed game on the basis of the acquired search information.

The display control block 5717 then causes the rendering section 56 to render the related picture based on the acquired play information (i.e., a display picture including at least either the play motion picture or the text information), and causes the display section 53 to display the rendered related picture (step SC7).

Performing the play information displaying process above causes the display device 2 to display the execution screen of the currently played game and enables the display section 53 of the mobile terminal 5 to display the related picture based on the play information searched for and acquired by the mobile terminal 5 in keeping with the state of progress on the game.

The above-described display pictures DP6 and DP7 are examples of the display picture displayed on the display section 53 of the mobile terminal 5 in the third use mode.

[Fourth Use Mode]

The fourth use mode is a use mode in which the mobile terminal 5 executes the game application to display the execution screen of the game, searches for and acquires play information based on the progress information about the game, and transmits the related picture based on the acquired play information to the information processing device 4 so that the information processing device 4 will display the related picture. That is, in the fourth use mode, the entity that executes the game and the entity that searches for and processes the play information are the mobile terminal 5. The entity that processes the related picture is the information processing device 4.

Figure 16:
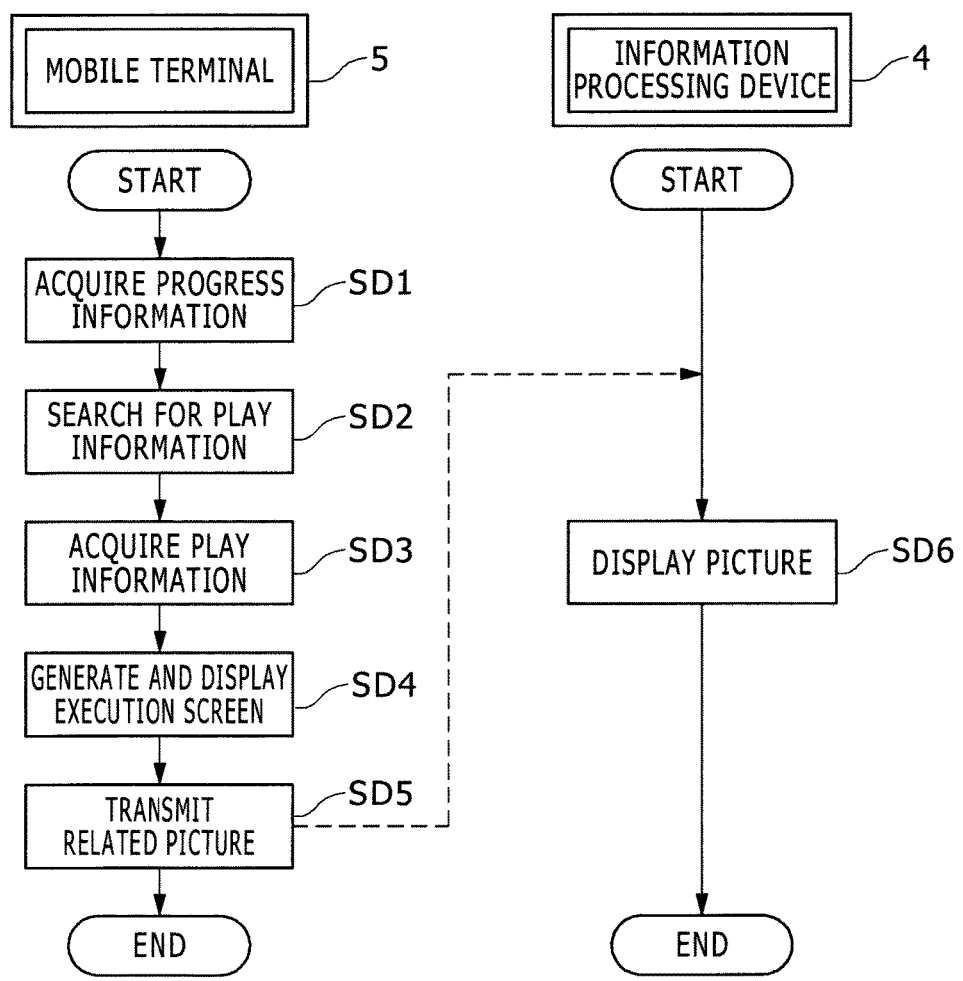
FIG. 16 is a flowchart depicting the play information displaying process performed in a fourth use mode of the embodiment.

FIG. 16 is a flowchart depicting the play information displaying process performed by the information processing device 4 or by the mobile terminal 5 in the fourth use mode.

In the fourth use mode, the information processing device 4 and the mobile terminal 5 perform the play information displaying process as described below.

In the play information displaying process, as depicted in FIG. 16, the functional blocks 5713 to 5717 of the mobile terminal 5 perform steps similar to the above-described steps SB1 to SB5 (steps SD1 to SD5). This permits acquisition from the data server SV1 of the play information corresponding to the state of progress on the currently executed game. The related picture based on the acquired play information is transmitted to the information processing device 4, with the execution screen of the game displayed on the display section 53.

Meanwhile, the display control block 4617 of the information processing device 4 causes the rendering section 45 to render the related picture received and acquired by the communication section 42 from the mobile terminal 5. The display control block 4617 then causes the display device 2 to display the rendered related picture (step SD6).

Performing the play information displaying process above causes the display section 53 to display the execution screen of the game executed by the mobile terminal 5, and allows the information processing device 4 to display on the display device 2 the related picture based on the play information searched for and acquired by the mobile terminal 5 in keeping with the state of progress on the game.

The above-described display pictures DP6 and DP7 are examples of the display picture displayed on the display section 53 of the mobile terminal 5 in the fourth use mode.

[Fifth Use Mode]

The fifth use mode is a use mode in which the mobile terminal 5 executes the game application to display the execution screen of the game and in which the information processing device 4 acquires from the mobile terminal 5 search information including progress information about the game, and searches for and acquires play information on the basis of the search information while displaying the related picture. That is, in the fifth use mode, the entities of processing in the third use mode are reversed. The entity that executes the game is the mobile terminal 5, and the entity that searches for and processes the play information is the information processing device 4.

Figure 17:
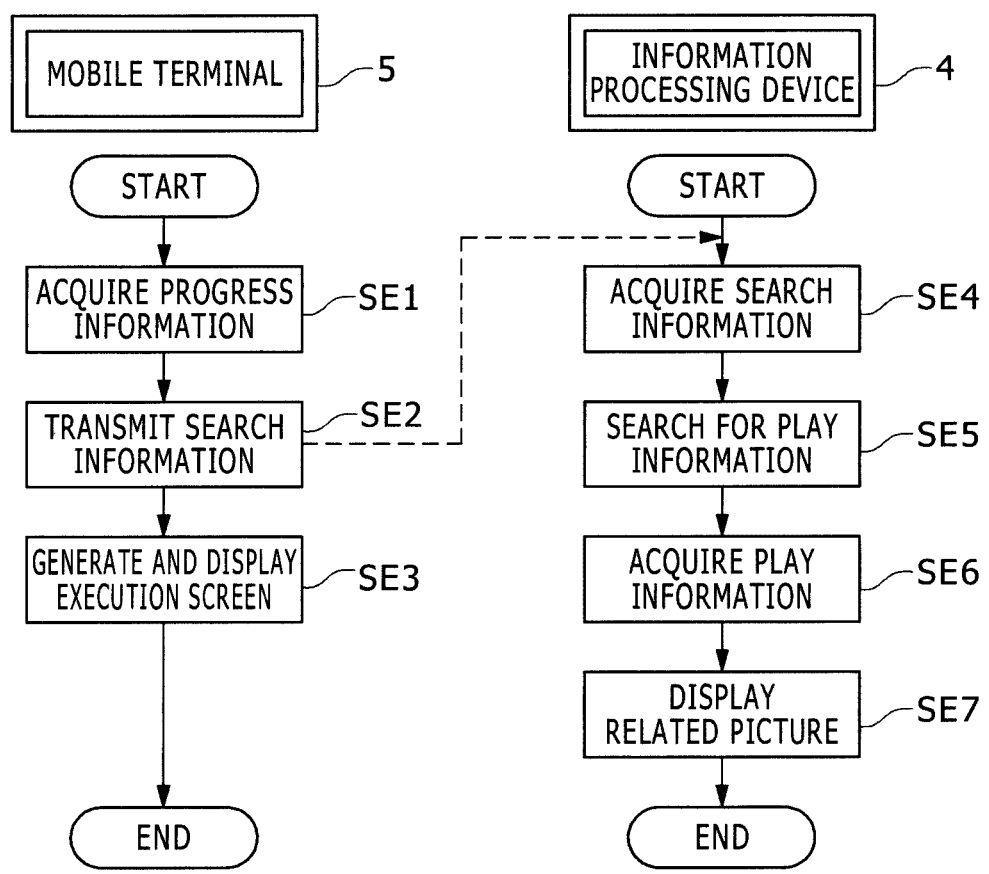
FIG. 17 is a flowchart depicting the play information displaying process performed in a fifth use mode of the embodiment.

FIG. 17 is a flowchart depicting the play information displaying process performed by the information processing device 4 or by the mobile terminal 5 in the fifth use mode.

In the fifth use mode, the information processing device 4 and the mobile terminal 5 perform the play information displaying process as described below.

In the play information displaying process, as depicted in FIG. 17, the functional blocks 5713 to 5717 of the mobile terminal 5 first perform steps similar to the above-described steps SC1 to SC3.

That is, the progress information acquisition block 5713 acquires the progress information indicative of the state of progress on the game currently executed by the application execution unit 572 (step SE1). The information transmission block 5714 transmits the search information to the information processing device 4 (step SE2).

Meanwhile, the display control block 5717 of the mobile terminal 5 causes the rendering section 56 to render and generate the execution screen of the currently executed game, and causes the display section 53 to display the execution screen (step SE3).

In this manner, the mobile terminal 5 continuously transmits to the information processing device 4 the search information including the progress information corresponding to the state of progress on the game while continuously displaying the execution screen of the currently executed game.

Meanwhile, the functional blocks 4613 to 4617 of the information processing device 4 perform steps similar to the above-described steps SC4 to SC7.

That is, the progress information acquisition block 4613 acquires the search information including the progress information from the mobile terminal 5 (step SE4).

Next, the play information search block 4615 and the play information acquisition block 4616 perform steps similar to the above-described steps SC5 and SC6. This permits acquisition from the data server SV1 of the play information corresponding to the state of progress on the currently executed game on the basis of the acquired search information (steps SE5 and SE6).

The display control block 4617 then causes the rendering section 45 to render and generate the related picture based on the acquired play information (i.e., a display picture including at least either the play motion picture or the text information), and causes the display device 2 to display the rendered related picture (step SE7).

Performing the play information displaying process above causes the display section 53 of the mobile terminal 5 to display the execution screen of the currently played game and enables the display device 2 to display the related picture based on the play information searched for and acquired by the information processing device 4 in keeping with the state of progress on the game.

The above-described display pictures DP6 and DP7 are examples of the display picture displayed on the display device 2 in the fifth use mode. The play motion picture PM reproduced as the display picture DP7 may be selected either by operating the mobile terminal 5 to transmit suitable operating information to the information processing device 4 or by operating the operating device 3.

[Effects of the Embodiments]

The information processing system 1 embodying the present invention as discussed above provides the following effects.

With the information processing system 1, the play information corresponding to the state of progress on the currently executed game is acquired from the network N. The related picture based on the acquired play information is displayed on the display device 2 or on the display section 53 of the mobile terminal 5. The user is thus presented with the related picture at a predetermined timing or in keeping with changes in the state of progress on the game currently played by the user (i.e., player). When thus presented with the picture serving as a reference to the currently played game, the user finds the game easier to play. Presenting the user with the related picture further contributes to improving the convenience of the information processing system 1 acting as a game system.

In the first use mode described above, the display device 2 or the display section 53 displays the display pictures DP1 and DP1 in which the execution screen and the related picture are displayed in different positions. That is, in each of the display pictures DP1 and DP2, the execution screen set in the execution screen setting area GA and the related picture set in the related picture setting area PA are displayed in different positions. This allows the execution screen and the related picture to be viewed individually. Because the execution screen is not hidden by the related picture, the game is easier to play.

In the first use mode above, the display device 2 or the display section 53 displays the display pictures DP3 to DP5 in which the related picture is superposed on the execution screen. That is, in each of the display pictures DP3 to DP5, the related picture setting area PA is set to be superposed on the execution screen setting area GA. When the stage selection screen or the item selection screen is displayed as the execution screen as in the display picture DP3 or DP4, this feature allows the related picture regarding each of the options included in the selection screen to be displayed corresponding to the position of that option. This permits easier verification of the content of each option or the virtual space within the game, making the game easier to play. Furthermore, as in the display picture DP5, the related picture rendered from the viewpoint of another player may be displayed corresponding to the position of the character CH1 or CH2 representing that player. Because the landscape from the viewpoint of each player can be thus verified, the field of view of the player in the game may be widened. This makes the game easier to play and enhances the player's sense of presence in the game.

The information processing system 1 has the display device 2 and the display section 53 of the mobile terminal 5 which correspond respectively to the first display section and the second display section and which are disposed in different positions. In this configuration, the display device 2 and the mobile terminal 5 can display a different picture each. For example, as in the second and the third use modes above, the execution screen may be displayed on the display device 2 and the related picture may be displayed on the display section 53. Alternatively, as in the fourth and the fifth use modes above, the execution screen may be displayed on the display section 53 and the related picture on the display device 2. In playing the game, the user can thus concentrate on the execution screen while making use of the device displaying the related picture as a sub-screen.

The mobile terminal 5 needs to retain its mobility, so that the display section 53 of the mobile terminal 5 has a smaller display area than the display device 2. In other words, the display device 2 has a wider display area than the display section 53.

For this reason, as in the second and the third use modes above, the execution screen may be displayed on the display device 2 having the relatively wide display area, and the related picture may be displayed on the mobile terminal 5 having the relatively small display area. This improves the visibility of the execution screen and makes the game easier to play.

Also, the information processing device 4 is subject to fewer constraints on the power supply, heat disposal, and internal space availability than the mobile terminal 5.

It follows that the information processing device 4 often provides a higher processing capacity than the mobile terminal 5.

In the second use mode above, the information processing device 4 executing the game application thus performs the process of acquiring play information. With its higher processing capacity, the information processing device 4 can avert problems such as delays in the progress of the game during the processing. The mobile terminal 5 need only cause the display section 53 to display the related picture received from the information processing device 4, so that the processing load on the mobile terminal 5 is reduced.

In the third use mode above, the information processing device 4 executes a game application requiring a relatively high processing capacity and causes the display device 2 to display the execution screen. The mobile terminal 5 executes the process of acquiring the play information corresponding to the state of progress on the game currently executed by the information processing device 4, thereby displaying the related picture. In this manner, the processing involved is shared by the information processing device 4 and by the mobile terminal 5. Even if the processing capacity of the information processing device 4 and that of the mobile terminal 5 are approximately the same, it is possible to unfailingly provide the play information corresponding to the state of progress on the game while the game is being played. The same also applies to the fifth use mode discussed above.

In the fourth use mode above, the mobile terminal 5 executes the game application and performs the process of acquiring the play information, with the information processing device 4 displaying the related picture received from the mobile terminal 5. In this manner, where the mobile terminal 5 has a higher processing capacity than the information processing device 4 or where the processing load on the information processing device 4 is desired to be reduced for less power consumption (to operate in power save mode), the processing load on the mobile terminal 5 is increased. This allows the mobile terminal 5 and the display device 2 to unfailingly display the execution screen and the related picture, respectively.

[Variations]

The present invention is not limited to the above-described embodiments. Variations, modifications, and improvements also fall within the scope of the present invention as long as they serve to achieve the objects thereof.

It was explained above that the information processing system 1 of the above-described embodiments is usable in each of the first to the fifth use modes above. However, this is not limitative of the present invention.

Alternatively, the information processing system 1 need only be usable in at least one of the first to the fifth use modes.

It was also explained above that the information processing system 1 of the above-described embodiments has two units U1 and U2 each including the display device 2, operating device 3, information processing device 4, and mobile terminal 5. This, however, is not limitative of the present invention. Specifically, the number of the units may be varied as needed. Also, one information processing device 4 may be connected with a plurality of mobile terminals 5 and may transmit the same or a different picture to each of the connected mobile terminals 5. Further, one mobile terminal 5 may take over the processing of the information processing device 4 and, in linkage with other mobile terminals 5, may constitute a configuration for use in at least one of the second to the fifth use modes above. That is, the information processing device 4 need not be a stationary game device or PC; the information processing device 4 may alternatively be a mobile terminal formed by a laptop PC, a smartphone, a tablet, or a handheld video game machine, for example.

It was also explained that the above-described embodiments display as the related picture either each of the play motions pictures and pieces of text information included in the play-time acquired information in the acquired play information, or the play motion pictures. This, however, is not limitative of the present invention. Alternatively, only the text information may be displayed. The text information is not limited to the information input by the user of the information processing system 1 and by other users. The text information may also be information input by the administrators of the servers SV1 and SV2.

Furthermore, the pictures based on the information acquired in keeping with the state of progress on the game are not limited to the pictures based on the play information. Alternatively, the pictures may be the result of the search performed by the play information search block 4615 or 5715. In this case, when the user selects desired information (e.g., play information) from the search result, that information may be arranged to be displayed. That is, any type of information may be presented as long as it corresponds to the state of progress on the currently executed game.

The display pictures DP1 to DP7 depicted in conjunction with the above-described embodiments are examples of the display picture DP. The layout and the content of the display pictures may be varied as needed.

It was further explained that the above-described embodiments display the related picture related to the state of progress on the game on the basis of the information (play information) acquired from the network in keeping with the state of game progress. However, this is not limitative of the present invention. Alternatively, a related sound related to the state of progress on the game may be arranged to be output. In this case, the related sound may be output alone or in combination with display of the related picture. Audio information constituting the related sound may be transmitted or output to an audio output device by the device that outputs the related picture (e.g., information processing device 4 or mobile terminal 5) to the display device in any one of the first to the fifth use modes above. For example, in the second and the third use modes, the mobile terminal 5 may cause the audio output section 54 to output the related sound. In the fourth and the fifth use modes, the audio output device connected to the information processing device 4 may output the related sound by receiving the audio information from the information processing device 4. As another example, in the first use mode, the related sound may be output in place of, or in combination with, the sound of the currently played game. In such cases, the audio output device may be that which is connected to the information processing device 4 and the mobile terminal 5.

Alternatively, the display device 2 having the audio output section or the operating device 3 equipped with the audio output section may serve as the audio output device. As another alternative, the information processing device 4 may be provided with an audio output section. Thus when the information processing device 4 is to output the related sound in the first use mode, the display device 2 having the audio output section may be caused to output the sound of the currently played game, and another audio output device such as the operating device 3 having the audio output section may be caused to output the related sound.

The related sound may also be BGM (background music) or sound effects related to the state of progress on the game (including the ambience in the game). Alternatively, the related sound may be a podcast related to the game or the sound distributed by another player in relation to the progress of the game.

It was explained that with the above-described embodiments, the play motion picture based on the play information transmitted in real time from another information processing device 4 to the data server SV1 is set and displayed in the related picture setting area PA, as depicted in the display picture DP5. In this manner, depending on the currently executed game, the play information that includes the play motion picture and that is transmitted in real time from another information processing device 4 or from another mobile terminal 5 may be acquired preferentially as the play information to be acquired in keeping with the state of progress on the game. Likewise, it is possible to acquire preferentially the play information that includes a play motion picture viewed with high frequency, the play information that includes a highly evaluated play motion picture (i.e., useful play motion picture), and the play information about a specific user (including the users registered beforehand by the player). Such priority sequence may be set by the user or by the management server SV2.

The play information may be evaluated at any timing. For example, the game may be allowed to progress in such a manner that the play information is evaluated when the user terminates the game, when the stage of the game is changed, when the play motion picture is changed, or when the user interrupts the game.

It was explained that with the above-described embodiments, the display controlling method of the present invention is included in the play information displaying process. This, however, is not limitative of the present invention. Alternatively, only the process reflecting the display controlling method may be arranged to be executed by the display control device such as the information processing device 4 and the mobile terminal 5. It was also explained that with the above-described embodiments, the play information displaying process including the steps indicated by the display controlling method of the present invention is held in the storage 43 and the memory section 55, the process being executed in accordance with the play information displaying program that includes the display controlling program of the invention. The play information displaying program is not limited in use to the mode in which it is held in the storage 43 and the memory section 55. Alternatively, the program may be stored in a server on the network or recorded on a disk-type recording medium or an externally attached semiconductor memory. At the time of execution, the program may be retrieved from any of these media where it is held. That is, the program may be stored in any form as long as it can be read and used by the computer such as the information processing device 4 and the mobile terminal 5.

INDUSTRIAL APPLICABILITY

The present invention may be adapted advantageously to information processing devices and mobile terminals capable of executing game applications, as well as to game systems provided with such information processing devices and mobile terminals.

REFERENCE SIGNS LIST

1 . . . Information processing system (game system)
2 . . . Display device (display section)
4 . . . Information processing device (display control device)
5 . . . Mobile terminal (display control device)
42, 52 . . . Communication section
53 . . . Display section
462, 572 . . . Application execution unit (execution unit)
4613, 5713 . . . Progress information acquisition block
4614, 5714 . . . Information transmission block (picture transmission block)
4616, 5716 . . . Play information acquisition block
4617 . . . Display control block (device-side display control block)
5717 . . . Display control block (terminal-side display control block)
N . . . Network

The invention claimed is:

1. A method for causing a game system to display a related picture, the method comprising:
executing a game application for a first user using a processor of the game system,
wherein the first user controls a player character in the game application using a game controller;
displaying, on a display of the game system,
a full screen execution screen of the game application;
acquiring over a network, a related picture related to a current state of progress of the first user in the game application;
wherein the related picture is created by a second user different from the first user; and
displaying, on the display, the related picture;
wherein the related picture includes a plurality of play moving pictures uploaded to the network by the second user, the plurality of play moving pictures being that of a same game application as the game application executed for the first user on the game system,
wherein a first play moving picture of the plurality of play moving pictures depicts play information corresponding to a position of the player character that the player character has moved past;
wherein a second play moving picture of the plurality of play moving pictures depicts play information corresponding to a position close to a current position of the player character,
wherein a third play moving picture of the plurality of play moving pictures depicts play information corresponding to a position ahead of the current position of the player character,
wherein the first play moving picture, the second play moving picture, and the third play moving picture are displayed if each has a transmission date within a predetermined time period of a current date, and
wherein the first play moving picture, the second play moving picture, and the third play moving picture are all displayed concurrently and non-overlapping on the display superimposed on the full screen execution screen.

2. A non-transitory computer readable medium having stored thereon a display controlling program for a game system, the display controlling program comprising steps of:
executing a game application for a first user using a processor of the game system,
wherein the first user controls a player character in the game application using a game controller;
displaying, on a display of the game system, a full screen execution screen of the game application;
acquiring, over a network, a related picture related to a current state of progress of the first user in the game application,
wherein the related picture is created by a second user different from the first user; and
displaying, on the display, the related picture;
wherein the related picture includes a plurality of play moving pictures uploaded to the network by the second user, the plurality of play moving pictures being that of a same game application as the game application executed for the first user on the game system.

* * * * *